(12) United States Patent
Beausoleil et al.

(10) Patent No.: US 7,560,726 B2
(45) Date of Patent: Jul. 14, 2009

(54) QUANTUM INFORMATION PROCESSING USING ELECTROMAGNETICALLY INDUCED TRANSPARENCY

(75) Inventors: Raymond G. Beausoleil, Redmond, WA (US); Adrian P. Kent, Bristol (GB); Philip J. Kuekes, Menlo Park, CA (US); William J. Munro, Bristol (GB); Timothy P. Spiller, Bristol (GB); R. Stanley Williams, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 252 days.

(21) Appl. No.: 10/364,987

(22) Filed: Feb. 11, 2003

(65) Prior Publication Data

US 2004/0156407 A1   Aug. 12, 2004

(51) Int. Cl.
*H01J 40/14* (2006.01)
(52) U.S. Cl. .............. 257/13; 257/E29.168; 359/107; 359/108
(58) Field of Classification Search ............... 257/9, 257/14, 48, 80, 428, 431, 432, 13, 21, 25, 257/E29.168; 385/125, 122; 372/43.01; 359/107, 108
See application file for complete search history.

(56) References Cited

U.S. PATENT DOCUMENTS

| | | | | |
|---|---|---|---|---|
| 3,562,662 A * | 2/1971 | Gould et al. | .................. | 372/55 |
| 5,422,907 A * | 6/1995 | Bhargava | .................... | 372/68 |
| 5,771,117 A * | 6/1998 | Harris et al. | ................ | 359/326 |
| 6,028,873 A * | 2/2000 | Yamamoto et al. | ........... | 372/39 |
| 6,101,203 A * | 8/2000 | Yamamoto et al. | ........... | 372/39 |
| 6,298,180 B1 * | 10/2001 | Ho | ................ | 385/15 |
| 6,633,053 B1 * | 10/2003 | Jaeger | .......... | 257/14 |
| 6,674,778 B1 * | 1/2004 | Lin et al. | ...................... | 372/46 |
| 6,678,450 B1 * | 1/2004 | Franson | ...................... | 385/122 |
| 6,711,200 B1 * | 3/2004 | Scherer et al. | ................ | 372/64 |
| 6,800,837 B1 * | 10/2004 | Ichimura et al. | ........ | 250/214 R |
| 6,826,339 B1 * | 11/2004 | Mueller | ...................... | 385/122 |
| 6,859,477 B2 * | 2/2005 | Deppe et al. | .................. | 372/45 |
| 6,864,501 B2 * | 3/2005 | Shields et al. | ................. | 257/13 |
| 2003/0053785 A1 * | 3/2003 | Ho | .............. | 385/129 |
| 2004/0175087 A1 * | 9/2004 | Soljacic et al. | .............. | 385/129 |
| 2004/0200949 A1 * | 10/2004 | Beausoleil et al. | ....... | 250/214.1 |
| 2004/0200950 A1 * | 10/2004 | Beausoleil et al. | ....... | 250/214.1 |
| 2004/0200952 A1 * | 10/2004 | Beausoleil et al. | ....... | 250/214.1 |

(Continued)

OTHER PUBLICATIONS

Kuriziki et al. "Self-induced transparency and giant nonlinearity in doped photonic crystals" arXi:quant-ph/0204076v1 Apr. 16, 2002. xxx.lanl.gov.*

(Continued)

*Primary Examiner*—Jerome Jackson, Jr.
*Assistant Examiner*—Matthew Reames

(57) ABSTRACT

Quantum information processing structures and methods use photons and four-level matter systems in electromagnetically induced transparency (EIT) arrangements for one and two-qubit quantum gates, two-photon phase shifters, and Bell state measurement devices. For efficient coupling of the matter systems to the photons while decoupling the matter systems from the phonon bath, molecular cages or molecular tethers maintain the atoms within the electromagnetic field of the photon, e.g., in the evanescent field surrounding the core of an optical fiber carrying the photons. To reduce decoherence caused by spontaneous emissions, the matter systems can be embedded in photonic bandgap crystals or the matter systems can be selected to include metastable energy levels.

18 Claims, 8 Drawing Sheets

U.S. PATENT DOCUMENTS

2005/0117836 A1* 6/2005 Franson et al. ................. 385/15

OTHER PUBLICATIONS

Yablonovitch, Eli "Inhibited Spontaneous Emission in Solid-State Physics and Electronics," Physical Review Letters vol. 58 p. 2059 1987.*

Optical Spectroscopy and Neon Lights, http://acept.la.asu.edu/PiN/rdg/optical/optical.shtml, 1999.*

Petrosyan and Kurizki "Photon-photon correlations and entanglement in doped photonic crystals," Phys. Rev. A. 64 023810, 2001.*

Petrosyan and Kurizki "Symmetric photon-photon coupling by atoms with Zeeman-split sublevels," Phys. Rev. A. 65 033833, 2002.*

Shields, "Quantum Logic with Light, Glass and Mirrors," Science 297, 1821, 2002.*

Shor, "quantum Information Theory: Results and Open Problems," In Geom. Funct Anal. GAFA2000,816, 2000.*

Torma, "Polarization in Quantum Computation," quant-phy/9602021v1, 1996.*

Lahiri and Pal "A first book of Quantum Field Theory," CRC Press, Washington DC Copyright 2001.*

Friedler et al. "Giant nonlinearity and entanglement of single photons in photonic bandgap structures," arXiv:quant-ph/0410019, 2004.*

Harris, S.E. and Yamamoto, Y., "Photon Switching by Quantum Interference," Physical Review Letters 81:17:3611-3614 (Oct. 26, 1998).

Imamoglu, A. et al., "Strongly Interacting Photons in a Nonlinear Cavity," Physical Review Letters 79:8:1467-1470 (Aug. 25, 1997).

Kurizki, Gershon et al., "Self-induced transparency and giant nonlinearity in doped photonic crystals," http://www.weizmann.ac.il/chemphys/gershon (Apr. 15, 2002).

Schmidt, H. and Imamoglu, A., "Giant Kerr nonlineartities obtained by electromagnetically induced transparency," Optics Letters 21:23:1936-1938 (Dec. 1, 1996).

Shimizu, Yukiko et al., "Control of Light Pulse Propagation With Only a Few Cold Atoms in a High-Finesse Microcavity," Physical Review Letters 89:23:233001-1 to 233001-4 (Dec. 2, 2002).

Barnett, A. et al., "Substrate-based atom waveguide using guided two-color evanescent light fields" (2000) Amer Phys Soc., Phys. Rev. A, vol. 61, 023608, p. 1-11.

Lee, R. et al., "Modified spontaneous emision from a two-dimensional photonic bandgap crystal slab" (2000) J. Opt. Soc. of America B, vol. 17, No. 8, 1438-1442.

Opatrny, T. et al., "Coupled cavities for enhancing the cross-phase-modulation in electromagnetically induced . . . " (2001) Amer Phys Soc., Phys. Rev. A, vol. 64, 023805, p. 1-9.

Rebic, S. et al., "Photon statistics of a single-atom intracavity system involving electromagnetically induced . . . " (2002) Amer Phys Soc, Phys Rev. A, vol. 65, 063804, p. 1-11.

Vitali, D. et al., "Complete Quantum Teleportation with a Kerr Nonlinearity" (2000) Amer Phys Soc., Phys. Rev. Ltrs., vol. 85, No. 2, p. 445-448.

* cited by examiner

QUANTUM INFORMATION PROCESSING USING ELECTROMAGNETICALLY INDUCED TRANSPARENCY

BACKGROUND

Interest in quantum information processing has grown dramatically in recent years because of recent successes in developing quantum systems and the expected capabilities of the technology. In particular, working quantum cryptosystems have been developed, and if large (many qubit) quantum computers can be built, quantum computers will perform many tasks much more efficiently than can classical computers. Quantum processors having tens or hundreds of qubits, for example, would be able to perform quantum simulations unreachable with any classical machine. Such quantum processors also have the potential to extend the working distances and applicability of quantum communications.

Many candidate technologies for quantum computing hardware are currently being studied. Whichever technology turns out to be most practical, quantum coherent communications will likely be needed for linking separate quantum processors. Coherent electromagnetic fields (as photonic qubits) seem ideal for communications between quantum computers and for general quantum communications because light, traveling either down optical fibers or even through free space, can carry quantum information over large distances. Further, some quantum computing may be performed directly on photonic qubits, using non-linear or linear quantum optical processes.

The interactions of photons with matter is likely to be an important ingredient in large-scale implementation of quantum information technology, and the ability to easily interconvert traveling photonic qubits and stationary matter qubits will be needed. Further, the ability to perform quantum gates (e.g., one-qubit and two-qubit gates) directly on qubits encoded into photon states is highly desirable for some quantum communications and computing.

FIG. 1 shows an exemplary system 100 in which photons interact with matter. In this example, system 100 includes an atom 110 and a low-loss resonator 120 that directs a unidirectional traveling electromagnetic wave of angular frequency $\omega_a$ for interaction with atom 110. Atom 110 can actually be an ensemble of one or more atoms, molecules, or other systems having at least two accessible quantum energy levels. Two of the accessible energy states |1> and |2> of atom 110 differ in energy by an amount $\hbar\omega_{12}$, where is the reduced Planck constant. The energy ($\hbar\omega_a$) of each photon in the traveling wave may be detuned from the energy difference between two energy levels of atom 110 as indicated in Equation 1, in which a detuning parameter $v_a$ is small relative to angular frequency $\omega_a$.

$$\hbar\omega_a = \hbar(\omega_{12}+v_a) \quad \text{Equation 1}$$

If atom 110 only has two accessible energy levels, atom 110 will have peak absorption of photons of energy $\hbar\omega_a$ when the detuning parameter $v_a$ is zero (i.e., when the photons are at a resonant frequency of atom 110). The absorption coefficient generally remains non-zero for other values of parameter $v_a$.

Electromagnetically Induced Transparency (EIT) is a phenomenon that can make atom 110 transparent to the photons at frequency $\omega_a$ in resonator 120. For EIT, atom 110 has at least three accessible energy levels, and a laser or other device applies an electromagnetic field referred to as a control field to atom 110 that creates quantum interference between the photonic and matter states.

FIG. 2A is a semi-classical energy level diagram comparing the energy levels of the three accessible energy states |1>, |2>, and |3> of atom 110 to the energy $\hbar\omega_a$ of a photon in resonator 120 and the energy $\hbar\omega_b$ of a photon in the control field applied to atom 110. As indicated in Equation 2, the energy $\hbar\omega_b$ of each photon in the control field is nearly equal to the energy difference $\omega_{32}$ between energy states |3> and |2> of atom 110 where a detuning parameter $v_b$ is small relative to angular frequency $\omega_b$.

$$\hbar\omega_b = \hbar(\omega_{32}+v_b) \quad \text{Equation 2}$$

FIG. 2B illustrates the energy levels of product states |X, A, B> of system 100. For product states |X, A, B>, X is 1, 2, or 3 indicating the energy level of atom 110, and A and B are the numbers of photons of angular frequencies $\omega_a$ and $\omega_b$, respectively. Rabi frequencies $\Omega_a$ and $\Omega_b$ in FIG. 2B represent the rate of absorption and stimulated emission of photons of angular frequencies $\omega_a$ and $\omega_b$ caused by the electric dipole interaction of the electric field of the photons with the corresponding dipole moment of atom 110. An example of an absorption or stimulated emission of a photon in resonator 120 in system 100 is a transition between product states |1, $n_a+1$, $n_b$> and |2, $n_a$, $n_b$>. In a spontaneous emission, an excited atom 110 can scatter a photon into free space (e.g., in the transition from state |2, $n_a$, $n_b$> to state |1, $n_a$, $n_b$>).

The control field frequency $\omega_b$ can be tuned to create quantum interference of the states of the photons and atom that minimize the rate at which atom 110 absorbs photons of angular frequency $\omega_a$. In particular, the absorption coefficient $\alpha(\omega_a)$ for atom 110 to absorb a photon of angular frequency $\omega_a$ falls to zero when detuning parameter $v_a$ is equal to zero. The applied control field thus makes atom 110 transparent to photons in resonator 120.

For quantum information processing purposes, one useful interaction of atom 110 with a photonic signal would introduce a phase change in the expectation value of the electric field operator of the photons when atom 110 is transparent to the photons or otherwise cause no (or minimal) signal loss. However, when the absorption coefficient is zero (or minimal), a three-level atom 110 causes no (or minimal) phase change in the state of the transmitted photons. A three-level atom is thus not currently considered to be suited for introducing a phase change in a photonic qubit.

In view of the current state of the art, there is a need for identifying a system that allows for the interaction of photon quantum states or qubits with matter systems to introduce phase changes in the photon quantum states without otherwise absorbing or dephasing the photon states.

SUMMARY

In accordance with an aspect of the invention, interactions of photons with an atom or matter system having four accessible quantum states can provide a negligible absorption coefficient and a tunable phase shift in a photonic qubit. Two of the accessible energy levels of the atom provide an interaction mechanism with the photonic qubit and have a difference in energy that is slightly detuned from the energy of a photon associated with the photonic qubit. A third accessible energy level is below the second energy level, and a fourth energy level is above the third energy level. Control fields applied to the matter create quantum interference between the matter and photonic qubit states and control a phase shift in selected photonic qubit states that interact with the matter system. As not previously appreciated, spontaneous emissions resulting from the transition of the atom from the fourth energy level should be suppressed to maintain a relatively small detuning constant and achieve a nearly transparent four-level matter system that imparts a significant phase shift to components of photonic qubits.

One mechanism for suppressing the spontaneous emissions from the fourth energy level embeds each interacting atom (or other four-level matter system) in a photonic bandgap crystal that does not permit propagation of photons having the wavelength associated with spontaneous emissions from the fourth energy level. A line defect in the photonic bandgap crystal can provide a path for applying control fields to the atom, while still suitably suppressing the undesired spontaneous emissions.

Another mechanism for suppressing the spontaneous emissions from the fourth energy level uses a four-level system in which that fourth energy level is metastable. Transitions to the metastable state can be driven either using two photons or the magneto-optical effect. In either case, the effective transition rate from the fourth energy level is small, but the intensity or detuning of the control field that drives transitions to the fourth energy level can be reduced to assure that phase shift of signal photon states accumulates at a reasonable rate.

In selected embodiments of the invention, a molecular tether or a molecular cage (e.g., a carcerand or fullerene) can attach each four-level atom or molecule to a waveguide or an optical fiber and help isolate the atoms or molecules from phonons that could cause decoherence.

One specific embodiment of the invention is a device including a waveguide, a matter system, and a suppressive structure. The waveguide is for an electromagnetic signal such as a photonic qubit. The matter system is positioned to interact with the electromagnetic signal and has multiple (typically four or more) quantum energy levels that are accessible for the interactions with the electromagnetic signal. The suppressive structure, which can be a photonic bandgap crystal surrounding the matter system, operates to suppress spontaneous emissions from the matter system, which can be critical when the state of matter system is entangled with the quantum state of the electromagnetic signal.

One embodiment of the device implements a tunable electromagnetically induced transparency (EIT) for a photonic qubit and creates a tunable phase shifter for a single Fock state photonic qubit or a coherent state photonic qubit. For the tunable phase shifter, control fields applied to the matter system can be varied to select a phase shift induced when a photonic qubit interacts with the matter system. An optical switch can similarly be implemented using variations of the control fields that change the transparency of the matter system and thus control whether the switch transmits or absorbs the traveling photons.

In another embodiment of the invention, a two-qubit phase gate operates on first and second photonic qubits. The two-qubit phase gate includes a four-level matter system to which the two photonic qubits (or components of the two photonic qubits) are applied. The first photonic qubit uses photon states corresponding to a frequency (e.g., angular frequency $\omega_a$) that is slightly detuned from the resonance associated with a transition between the first and second energy levels of the four-level matter system. The second photonic qubit uses photon states corresponding to a frequency (e.g., angular frequency $\omega_c$) that is slightly detuned from the resonance associated with a transition between the two other energy levels of the four-level matter system. A control field applied to the matter system provides photons having a frequency (e.g., angular frequency $\omega_b$) associated with another pair of energy levels of the four-level matter system. The two-qubit phase gate introduces a relative phase shift only to a cross-product state that provides photons of both signal frequencies (e.g., angular frequencies $\omega_a$ and $\omega_c$) for interaction with the matter system. A CNOT quantum gate can be constructed from the two-qubit phase gate.

Another embodiment of the invention that can be used to construct a CNOT gate is a two-photon phase shifter including a four-level matter system. The two-photon phase shifter acts on an input photon state that includes components of definite photon numbers 0, 1, and 2. Control fields applied to the four-level matter system have angular frequencies corresponding to transitions between the second and third energy levels and the fourth and third energy levels of the matter system. The signal photons have an angular frequency associated with one-half the energy difference between the second and first energy levels of the matter system. Accordingly, the two-photon component of the input photon state, which has sufficient energy to induce a transition from the first to the second energy levels of the matter system, experiences EIT and a phase shift, and the other components, which do not have sufficient energy, do not undergo a phase shift. In one specific embodiment, the four-level matter system can further have a fifth accessible energy level about halfway between the first and second energy levels. The fifth energy level permits interaction of the one-photon state to equalize propagation delays between one-photon and two-photon states, without phase shifting the one-photon state.

In another embodiment of the invention, a Bell-state measurement device includes a CNOT gate that can be implemented using a two-qubit phase gate or a two-photon phase shifter in accordance with alternative embodiments of the invention. The CNOT gate in the measurement device converts each input Bell state into a corresponding output cross-product state, and detectors can separately identify the factors states in the output cross-product state to determine the input Bell state.

Yet another embodiment of the invention is a quantum information processing method. The method uses a quantum information signal containing photons having a first frequency that provides a coupling between a first energy level and a second energy level of a matter system. Electromagnetic fields including photons having a second frequency that provides a coupling between a third energy level and the second energy level of the matter system and photons having a third frequency that provides a coupling between the third energy level and a fourth energy level of the matter system are applied to the matter system while a quantum information signal is directed for an interaction with the matter system. The method further includes suppressing spontaneous emissions corresponding to transitions from the fourth energy level of the matter system. The suppression may employ a photonic bandgap crystal surrounding the matter system to blocks spontaneous emissions or may select the matter system so that the fourth energy level is metastable.

BRIEF DESCRIPTION OF THE DRAWINGS

Use of the same reference symbols in different figures indicates similar or identical items.

DETAILED DESCRIPTION

Figure 3A:
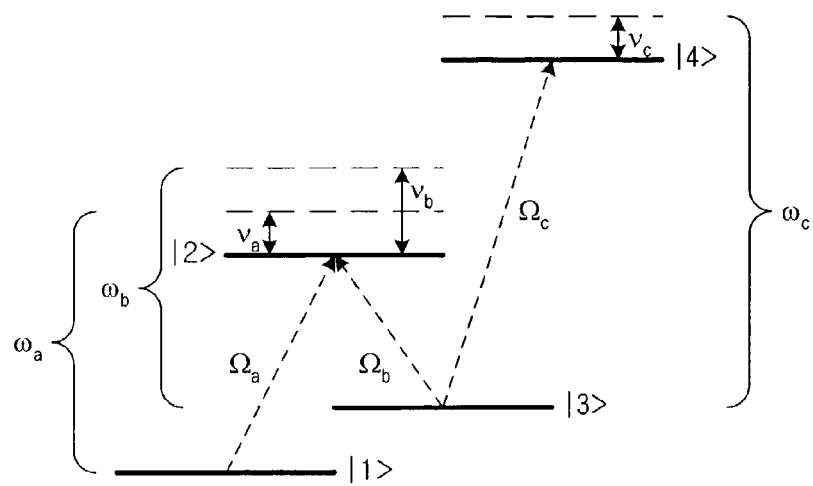
FIGS. 3A and 3B respectively illustrate semiclassical energy levels and a quantum energy manifold for the system of FIG. 1 when the interacting atoms or molecules have four accessible energy levels.

Precise deterministic control of the phase and intensity of a photonic probe pulse can be obtained using a four-level matter system interacting with the probe pulse and a pair of control fields. FIG. 3A illustrates the energy levels of energy states |1>, |2>, |3>, and |4> of a four-level system relative to the energies of photons having angular frequencies $\omega_a$, $\omega_b$, and $\omega_c$. Photons of angular frequency $\omega_a$ couple atomic energy level |1> to energy level |2>. Photons of angular frequency $\omega_b$ and $\omega_c$ couple the metastable energy level |3> to energy levels |2> and |4>, respectively. Detuning parameters $\nu_a$, $\nu_b$, and $\nu_c$ indicated the respective amount of detuning of angular frequencies $\omega_a$, $\omega_b$, and $\omega_c$ from resonances of the energy level transitions of the matter system as indicated in Equations 3. In Equations 3, the energy differences between states |1> and |2>, between |3> and |2>, and between |3> and |4> are $\omega_{12}$, $\omega_{32}$, and $\omega_{34}$, respectively.

$\omega_a = (\omega_{12} + \nu_a)$ $\omega_b = (\omega_{32} + \nu_b)$ $\omega_c = (\omega_{34} + \theta_c)$      Equations 3

Figure 3B:
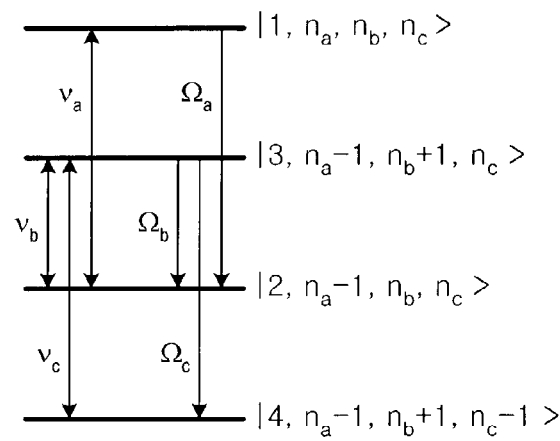

FIG. 3B shows a manifold corresponding to product states |X, A, B, C>, where X indicates the energy level of the matter system, and A, B, and C indicate the numbers of photons of angular frequencies $\omega_a$, $\omega_b$, and $\omega_c$, respectively. The illustrated manifold includes the states closest in energy to a matter system in state |1>, with $n_a$ photons of angular frequency $\omega_a$, $n_b$ photons of angular frequency $\omega_b$, and $n_c$ photons of angular frequency $\omega_c$. A spontaneous emission of a photon to the surrounding environment would move the system to an energy level in a manifold that is similar to the manifold illustrated in FIG. 3B but having fewer photons of the type lost to the environment.

For calculations, the product states of FIG. 3B can be extended to include energy dissipation to the environment by appending to each product state an entry indicating the occurrence of scattering of a photon of frequency $\omega_a$, $\omega_b$, or $\omega_c$. Therefore, a triply-degenerate, non-resonant sub-manifold that captures dissipated energy and preserves the trace of the density matrix can represent the environment.

Figure 3C:
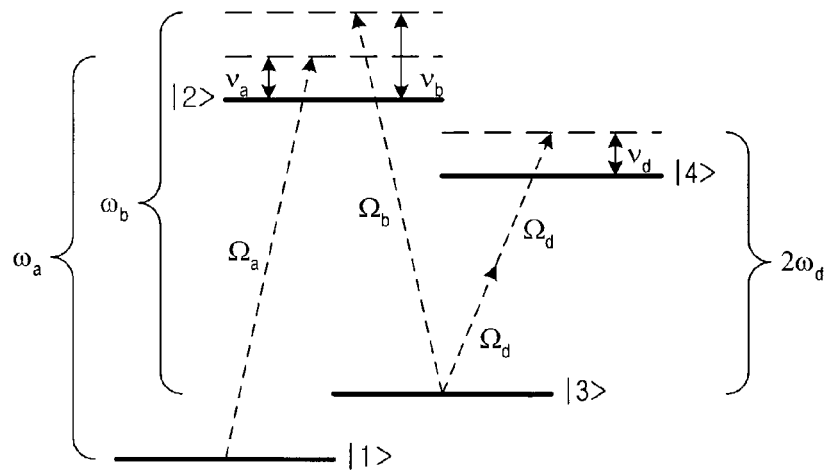
FIG. 3C illustrates semiclassical energy levels for interacting atoms or molecules that suppress spontaneous emissions from the fourth energy level.

FIG. 3C illustrates the energy levels of energy states |1>, |2>, |3>, and |4> of another four-level system relative to the energies of photons having angular frequencies $\omega_a$, $\omega_b$, and $\omega_d$. As in the four level system of FIG. 3A, photons of angular frequency $\omega_a$ couple atomic energy level |1> to energy level |2> and photons of angular frequency $\omega_b$ couple the metastable energy level |3> to energy levels |2>. However, for four-level system of FIG. 3C, energy state |4>, like third energy state |3>, is metastable in that no single-photon spontaneous emission is permitted. Metastability may result, for example, if the spin/angular momentum of the energy state and available lower energy states is such that a conservation law forbids emission of a single photon when transitioning to the lower state. Control fields driving the transition to the fourth energy have an energy $\omega_d$ that is about one half of the transition energy $\omega_{34}$ to permit a two-photon transition to the fourth energy state. Alternatively, the magneto-optical effect can drive the transitions to the fourth energy level. As described further below, the metastability of the fourth energy level and the resulting reduction in spontaneous emissions from the fourth energy level is beneficial for quantum information processing.

Figure 4A:
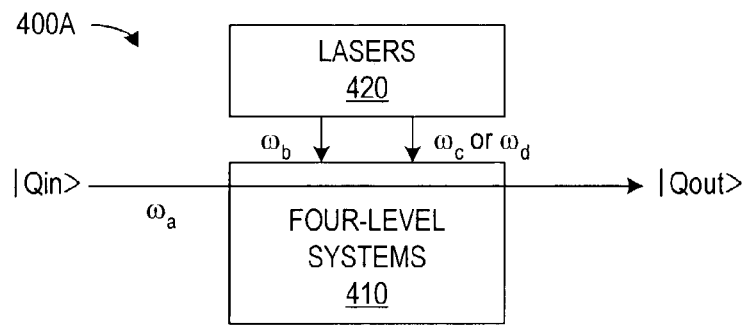
FIGS. 4A, 4B, and 4C are block diagrams of single qubit gates in accordance with alternative embodiments of the invention.

In accordance with an aspect of the invention, a quantum gate employs photons and a four-level matter system having the energy levels illustrated in FIGS. 3A and 3B or FIG. 3C. FIG. 4A, for example, illustrates a one-qubit gate 400A employing four-level matter system 410. Four-level matter system 410 will generally include an ensemble of one or more atoms, molecules, or other systems having at least four energy levels that are available for interaction with the photons used in the gate. The four energy levels of the matter system are related to photon energies (or angular frequencies) as illustrated in FIG. 3A or 3C.

One-qubit gate 400 has an input photonic qubit state |Qin> with a frequency $\omega_a$, which can enter system 410 via free space, a waveguide, or an optical fiber. Structures for guiding an input photonic qubit for interaction with four-level matter system 410 are described further below. Input qubit state |Qin> is generally a superposition of states |Q0> and |Q1>, where state |Q0> represents one binary value (e.g., 0) of the qubit and state |Q1> represents the other binary value (e.g., 1) of the qubit. For one-qubit gate 400A, one of states |Q0> and |Q1> corresponds to the presence of a single photon of angular frequency $\omega_a$, and the other of states |Q1> and |Q0> corresponds to the absence of any photons of angular frequency $\omega_a$. The vacuum (i.e., no photon) state does not interact with four-level matter system 410, but the state corresponding to the presence of a photon of angular frequency ha interacts with four-level system 410, causing an output qubit state |Qout> to differ from input qubit state |Qin>.

Figure 4B:
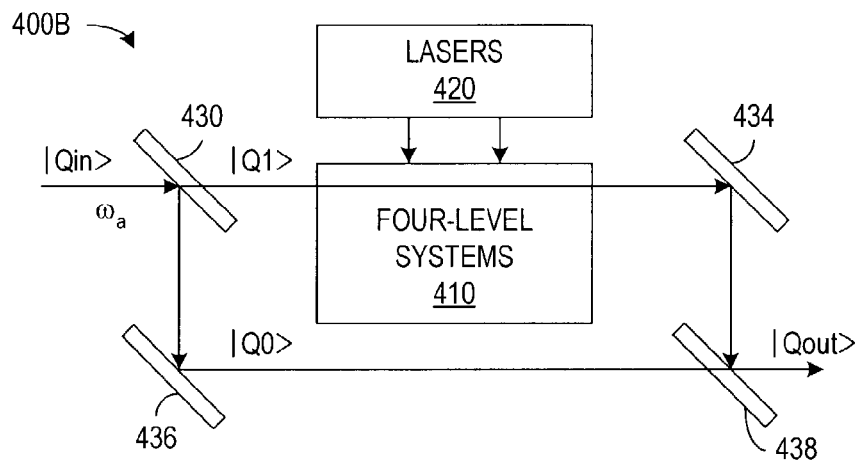

FIG. 4B illustrates an interferometer-based, one-qubit gate 400B that employs interactions with four-level system 410 to convert an input qubit state |Qin> to an output qubit state |Qout>. For one-qubit gate 400B, the component states |Q0> and |Q1> of qubit state |Qin> both represent photon pulses with angular frequency $\omega_a$ but the photons corresponding to states |Q0> and |Q1> differ in a manner that permits spatial separation. In the illustrated embodiment of FIG. 4B, states |Q0> and |Q1> correspond to different orthogonal polarizations of a single photon or of a coherent photon pulse with angular frequency $\omega_a$, and a beamsplitter 430 (e.g., a polarizing beamsplitter) spatially separates the two component states |Q0> and |Q1>. With alternative qubit encodings, component states |Q0> and |Q1> may represent photons having different spin (i.e., states that differ in the z component of their angular momentum) or photons having slightly different momentum. Other qubit encodings are possible, and the element (e.g., polarizing beamsplitter 430) that separates component states |Q0> and |Q1> can be selected according to the qubit encoding employed.

In FIG. 4B, one-qubit gate 400B directs a photon in state |Q1> for interaction with four-level matter system 410. After four-level system 410 interacts with state |Q1>, photons exiting four-level system 410 reflect from a mirror 434 into a beam combiner 438. A photon in state |Q0> travels from beamsplitter 430 to mirror 436, and from mirror 436 into beam combiner 438, without interacting with four-level system 410. Beam combiner 438, which may be implemented using a polarizing beam splitter for polarization-encoded qubits, combines photons from the two paths to construct output qubit state |Qout>.

Figure 4C:
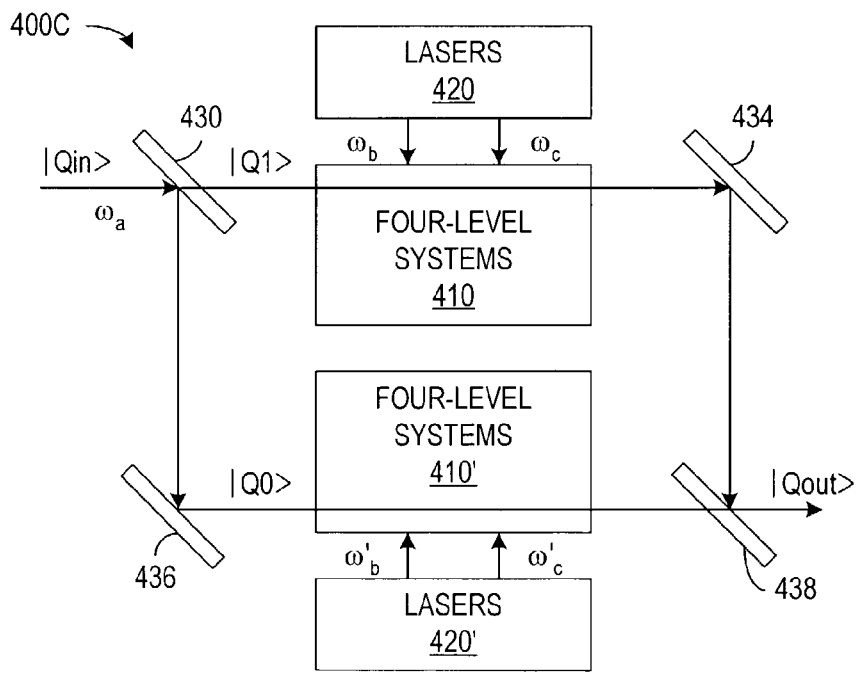

A one-qubit gate 400C illustrated in FIG. 4C directs a photon in state |Q1> for interaction with four-level matter system 410 and directs a photon in state |Q0> for interaction with four-level matter system 410'. After interacting with respective four-level systems 410 and 410', photons corresponding to input states |Q1> and |Q0> enter beam combiner 438, which combines photon states to construct output qubit state |Qout>. Matter systems 410 and 410' have control fields from independent sources 420 and 420', so that the interactions of states |Q1> and |Q0> with matter systems 410 and 410' have different effects (e.g., opposite phase shifts), and the output qubit state |Qout> differs from input qubit state |Qin> in a manner that depends on the function of one-qubit gate 400C.

A laser or other optical source 420 applies electromagnetic control fields containing photons of angular frequencies $\omega_b$ and $\omega_c$ to four-level system 410. The control fields effectively induce quantum interference between photon states of angular frequency $\omega_a$ and the energy states of matter system 410. In particular, the application of the control fields provides an AC Stark shift of the third energy level, which affects the absorption and refractive index of four-level system 410. The angular frequencies $\omega_b$ and $\omega_c$ of photons in the control fields can be adjusted to cause the desired interaction (e.g., transparency and a desired phase shift) for photons of angular frequency $\omega_a$.

In gate 400C, a separate laser or optical source 420' applies electromagnetic control fields containing photons of angular frequencies $\omega'_b$ and $\omega'_c$ to four-level system 410'. Angular frequencies $\omega'_b$ and $\omega'_c$ can be adjusted to cause the desired interaction of photons of angular frequency $\omega'_a$ with four-level system 410'. For example, four-level systems 410' can be adjusted to cause a phase shift that is opposite to that caused in four-level systems 410, so that the phase shift of state |Q1> relative to state |Q0> will be twice that introduced in four-level system 410. Use of two four-level systems 410 and 410' thus can cut reaction times in half, permitting shorter coherence time for the qubits. Additionally, having four-level systems interacting with both component states of the qubit may better match the timing of output photon pulses in state |Qout>.

Figure 1:
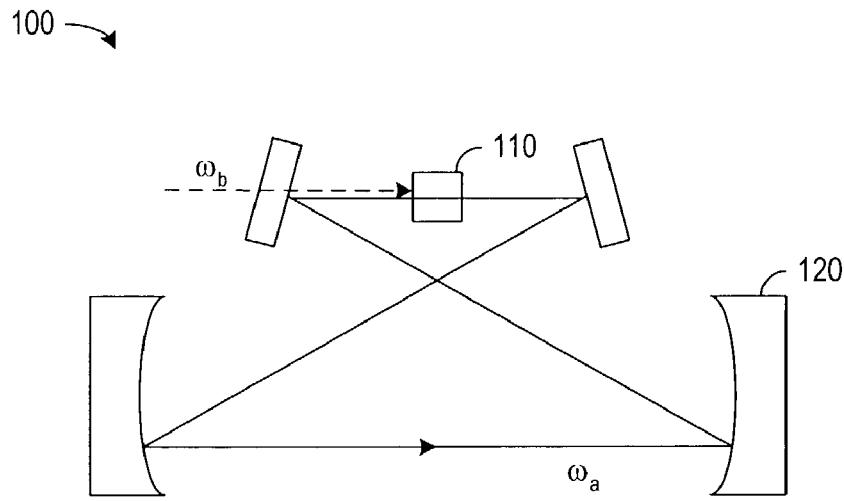
FIG. 1 represents a system providing coherent interactions between photons and matter and permitting electromagnetically induced transparency.
Figure 2A:
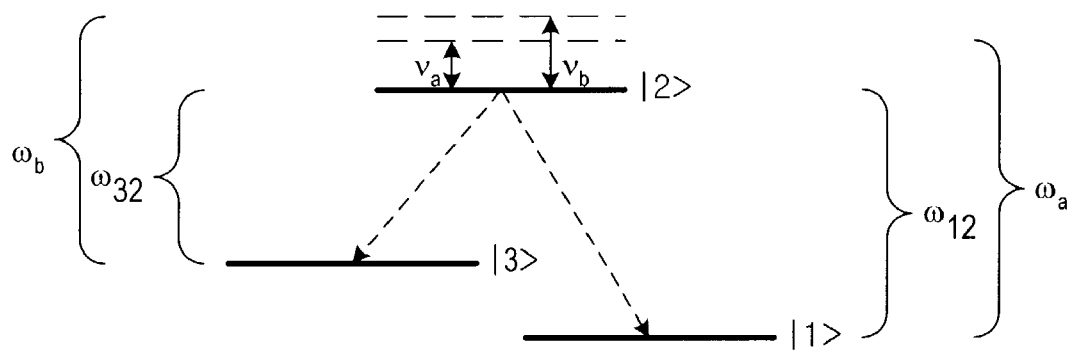
FIGS. 2A and 2B respectively illustrate semiclassical energy levels and quantum energy manifolds for the system of FIG. 1 when the interacting atoms have three accessible energy levels.
Figure 2B:
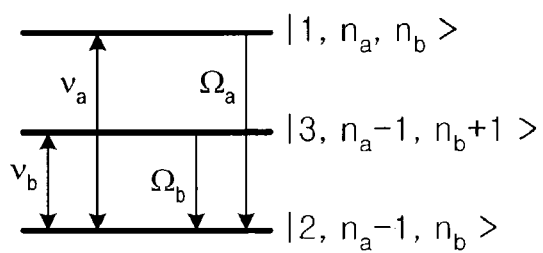

The utility of the coherent population transfer in four-level system 410 for the creation, transmission, reception, storage, and processing of quantum information can be accessed through evaluation of the time dependence of a coherent superposition of discrete states (e.g., state |Qin>) that are input into the four-level system. For example, consider a combined photon/atom system of FIG. 1 where the system is initially in a pure state |ψ> consisting of a superposition of two manifold states as in Equation 4. In Equation 4, state |1, 0> represents the atom in the first energy level (e.g., the ground state) and zero photons in resonator 120 of FIG. 1, and state |1, $n_a$> represents the atom at the first energy level and $n_a$ photons in resonator 120.

Equation 4: $|\psi\rangle = \frac{1}{\sqrt{2}}(|1, 0\rangle + |1, n_a\rangle)$

Equation 5 defines a unitary phase shift operator $\Phi(\phi)$ where operators $a^\dagger$ and a are the creation and annihilation operators for a photon of frequency $\omega_a$. The unitary phase shift operator $\Phi(\phi)$ of Equation 5 transforms state |ψ> to a state |ψ'> as shown in Equation 6. Note that each Fock state photon contributes equally to the total accumulated relative phase shift $n_a\phi$ between states |1, 0> and |1, $n_a$>.

$\Phi(\phi) \equiv e^{i\phi a^\dagger a}$      Equation 5

Equation 6: $|\psi'\rangle = \Phi(\varphi)|\psi\rangle = \frac{1}{\sqrt{2}}(|1, 0\rangle + e^{in_a\varphi}|1, n_a\rangle)$ The phase shift operator $\Phi(\phi)$ can be similarly applied to a coherent photon state, which is defined in terms of Fock states as indicated in Equations 7. In Equations 7, Fock state |n> represents a state of containing n photons of angular frequency $\omega$, and $n_V$ is the mean occupation number of the coherent state |α(t)>. Beginning with a superposition of an empty resonator and a coherent state |1, α> in place of Fock state |1, $n_a$> in the state |ψ> yields the phase shift result of Equation 8, which is in accordance with our intuition for classical fields.

Equations 7: $|\alpha(t)\rangle = e^{-\frac{1}{2}|\alpha(t)|^2} \sum_{n=0}^{\infty} \frac{\alpha^n(t)}{\sqrt{n!}} |n\rangle$ $\alpha(t) = \sqrt{\langle n_V \rangle}\, e^{-i\varpi_a t}$ Equation 8: $|\psi'\rangle = \Phi(\varphi)|\psi\rangle = \frac{1}{\sqrt{2}}(|1, 0\rangle, e^{i\varphi}|1, \alpha\, e^{i\varphi}\rangle)$ $\approx \frac{1}{\sqrt{2}}(|1, 0\rangle + e^{i\varphi\alpha^2}|1, \alpha\rangle)$ Gate 400A can physically implement the phase shift operator if the interaction of the photon with the four-level system 410 produces the desired phase shift. Similarly, if the photon-matter interaction has the desired properties, the Mach-Zehnder interferometer shown in FIG. 4B could provide a physical implementation of a phase shift operator for a dual-rail coherent superposition.

To characterize the photon-matter interaction, the product states can be augmented to account for the control fields and spontaneous emission. The resulting density matrix equations of motion for a dipole interaction between the photons and a four-level matter system can then be solved to determine density matrix elements that allow direct read out of the phase φ in Equations 6 and 8 in terms of experimentally determined parameters such as Rabi frequencies $\Omega_a$, $\Omega_b$, and $\Omega_c$ and laser detuning parameters $v_a$, $v_b$, and $v_c$. A calculated density matrix element $\rho_{10}$ corresponding to the coherence between the states $|1, 0\rangle$ and $|1, n_a\rangle$ is given in Equation 9, where Equation 10 defines the phase $W_{10}$ of the density matrix element $\rho_{10}$ when detuning parameters $v_a$ and $v_b$ are set to zero to minimize absorption of photons by the four-level matter system.

Equation 9: $\rho_{10} \cong \frac{1}{2} e^{(-\gamma_{10} + iW_{10})t}$

Equation 10: $W_{10} \equiv \frac{i[|\Omega_c|^2 + \gamma_{30}(\gamma_{40} - iv_b)] \cdot |\Omega_a|^2}{\gamma_{20}|\Omega_c|^2 + (\gamma_{40} - iv_b)(\gamma_{30}\gamma_{20} + |\Omega_b|^2)}$ In Equations 9 and 10, $\gamma_{10}$, $\gamma_{20}$, $\gamma_{30}$, and $\gamma_{40}$ are decoherence rates respectively for the first, second, third, and fourth energy levels of the matter system. Decoherence rate $\gamma_{20}$ or $\gamma_{40}$ includes a contribution corresponding to spontaneous emissions of a photon when the four-level matter system transitions from the corresponding second or fourth energy level to a lower energy level. Decoherence rate $\gamma_{30}$ doesn't have a contribution corresponding to spontaneous emissions but, like rate $\gamma_{10}$, is just due to dephasing when the four-level matter system is in a state corresponding to the third energy level. Low decoherence rates are generally desired, but for reasons explained below, to achieve the desired quantum computing and communication properties desired from photon interactions with a four-level matter system, spontaneous emissions from the fourth energy level should be suppressed.

The real part of phase $W_{10}$ represents an actual phase shift of a photon state encountered in the interaction with the four-level matter system, and the imaginary part of phase $W_{10}$ represents a residual absorption of photons. If the dephasing rates are much smaller than the depopulation rates of the upper atomic levels, then the ratio of the real and imaginary parts of phase $W_{10}$ is given in Equation 11A, and if rates $\gamma_{20}$ and $\gamma_{40}$ are about the same and $|\Omega_b|^2$ is much greater than $|\Omega_c|^2$, the ratio simplifies to Equation 11B. Equation 11B demonstrates that the detuning parameter $v_c$ must be large relative to $\gamma_{40}$ to make the ratio of the real and imaginary parts of $W_{10}$ large. In this limit, Equation 12 gives the approximate phase shift, and Equation 13 give the decay rate of the amplitude of $\rho_{10}(t)$.

Equation 11A: $\frac{\text{Re}(W_{10})}{\text{Im}(W_{10})} = -\frac{v_c|\Omega_b|^2}{\gamma_{20}|\Omega_c|^2 + \gamma_{40}|\Omega_b|^2}$ Equation 11B: $\frac{\text{Re}(W_{10})}{\text{Im}(W_{10})} = -\frac{v_c}{\gamma_{40}}$ Equation 12: $\varphi(t) \approx -\frac{|\Omega_a|^2|\Omega_c|^2}{v_c|\Omega_b|^2} t = -\frac{|\Omega_a|^2}{v'_c} t$ Equation 13: $\text{Im}(W_{10}) \approx \frac{\gamma_{40}|\Omega_a|^2|\Omega_c|^2}{v_c^2|\Omega_b|^2}$ Equation 14: $v'_c \equiv \frac{|\Omega_b|^2}{|\Omega_c|^2} v_c$ The phase shift given by Equation 12 has the same essential form as the corresponding phase shift for a two-level system except that the detuning parameter of the two-level system is replaced by an effective detuning parameter $v'_c$ given in Equation 14. Therefore, a given phase shift can be obtained in the four-level system using a much smaller detuning than that of the two-level system. However, the fidelity and the entropy of the four-level system will be determined by the ratio $\gamma_{40}\pi/v_c$ and is independent of the number N of atoms in the interaction region. Accordingly, if the decoherence rate $\gamma_{40}$ cannot be made sufficiently small, achieving a phase shift of □π with a high fidelity and a low entropy may require an enormous detuning $v_c$ and/or an extremely long interaction time.

In accordance with an aspect of the present invention described further below, the interaction region can be placed within a photonic bandgap crystal (PBGC) designed to suppress spontaneous emissions from the fourth energy level in FIG. 3A. This suppresses the undesirable spontaneous emissions, but may also block input of control photons with angular frequency $\omega_c$. However, control photons with angular frequency $\omega_c$ can be injected through a defect in the PBGC. Alternatively, the fourth energy level can metastable as in FIG. 3C, which suppresses spontaneous emissions. Further, it may be possible to synthesize a four-level system (e.g., a molecule) that can be forced, using electromagnetic or chemical means, to suppress spontaneous emissions from the fourth energy level without embedding the four level system in a bandgap crystal. For a control fields with frequencies $\omega_b$ and $\omega_c$, if Rabi frequency $|\Omega_b|^2$ is much greater than Rabi frequency $|\Omega_c|^2$ and $\gamma_{20}|\Omega_c|^2$ is much greater than $\gamma_{40}|\Omega_b|^2$, the ratio of the real and imaginary parts of phase $W_{10}$, the phase shift, and the decay rate are then respectively given in Equations 15, 16, and 17.

Equation 15: $\frac{\text{Re}(W_{10})}{\text{Im}(W_{10})} = -\frac{v'_c}{\gamma_{20}}$ Equation 16: $\varphi(t) \approx -\frac{|\Omega_a|^2}{v'_c} t$ Equation 17: $\text{Im}(W_{10}) \approx \frac{\gamma_{20}|\Omega_a|^2}{v'^2_c}$ A system operating in a domain in which Equations 15-17 are valid, in the limit where decoherence rate $\gamma_{40}$ goes to 0, is mathematically similar to a two-level system. In particular, the four-level, two-photon nonlinear phase shift can be mapped onto the two-level, one-photon linear phase shift simply by replacing the detuning parameter of the two-level system with effective detuning parameter $v'_c$. However, the detuning $v_c$ in the four-level system can be much smaller than the corresponding photon detuning in the two-level system for the same fidelity and phase shift in the photon states. That this nonlinear phase shift can be as large as the corresponding linear phase shift indicates the presence of an enormous third-order Kerr nonlinearity that couples the three fields of angular frequencies $\omega_a$, $\omega_b$, and $\omega_c$. This nonlinearity may be achieved with only modest detuning to provide both a high differential phase shift and a low absorption rate in the semi-classical realm.

Figure 5A:
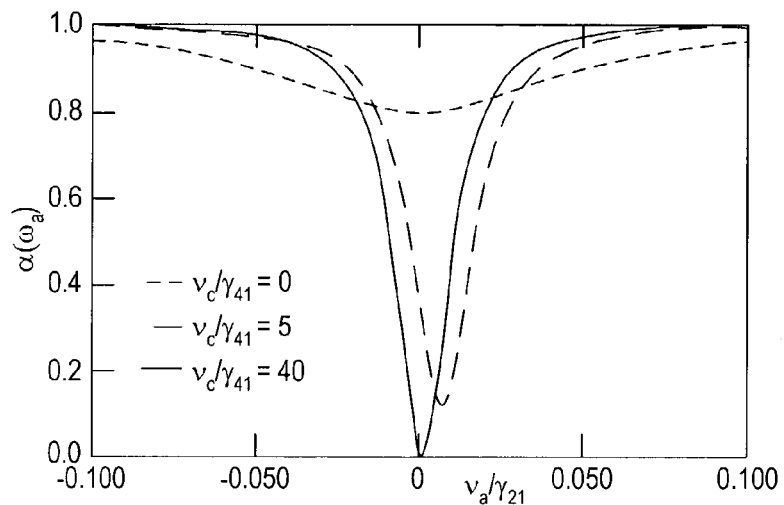
FIGS. 5A, 5B, and 5C contain plots of illustrating the respective calculated dependence of a refractive index, an absorption coefficient, and a third-order susceptibility on the ratio of the detuning parameters and the decoherence rates.

An absorption coefficient $\alpha(\omega_a)$ and a refractive index $\eta^2(\omega_a)-1$ for photons of angular frequency $\omega_a$ can be calculated using the density matrix element $\rho_{21}$ corresponding to the coherence between the states $|1, n_a, n_b, n_c\rangle$ and $|2, n_a-1, n_b, n_c\rangle$. FIG. 5A illustrates the calculated dependence of an absorption coefficient $\alpha(\omega_a)$ on ratio $\theta_a/\gamma_{21}$ for three different values of ratio $v_c/\gamma_{41}$. Ratios $v_a/\gamma_{21}$ and $v_c/\gamma_{41}$ are the ratios of respective detuning parameters $v_a$ and $v_c$ to the respective decoherence rates $\gamma_{21}$ and $\gamma_{41}$ that include spontaneous emissions corresponding to the transitions from the second and fourth energy level to the first energy level. A decoherence or dephasing rate $\gamma_{31}$ is due to external interactions. When the decoherence rate $\gamma_{31}$ approaches zero and angular frequency $\omega_c$ is at resonance (i.e., $v_c=0$), FIG. 4A shows that absorption coefficient $\alpha(\omega_a)$ is greater than about 0.8 for all values of $v_d/\gamma_{21}$ in the illustrated range. For specific values of ratio $v_d/\gamma_{21}$, absorption coefficient $\alpha(\omega_a)$ drops to near zero when the ratio $v_c/\gamma_{41}$ is relatively large (e.g., greater than about 5). Accordingly, if the decoherence rate $\gamma_{41}$ for the fourth energy level can be kept reasonably low, varying the angular frequency $\omega_c$ of the control field can switch the absorption coefficient $\alpha(\omega_a)$ from transparent to opaque for specific frequencies $\omega_a$.

Figure 5B:
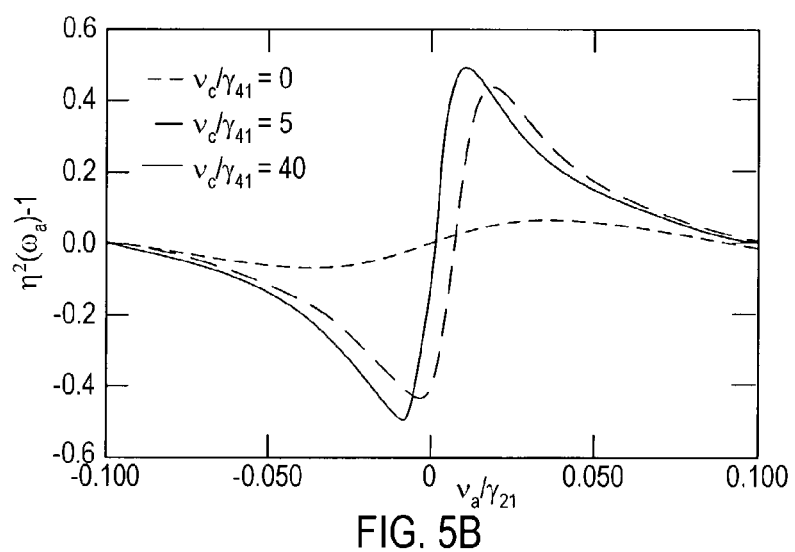

FIG. 5B illustrates the dependence of the refractive index $\eta^2(\omega_a)-1$ on ratio $v_c/\gamma_{21}$ for three different values of ratio $v_c/\gamma_{21}$ when the rate $\gamma_{31}$ of relative dephasing between the first and third energy levels approaches zero. A comparison of FIGS. 5A and 5B shows that when absorption coefficient $\alpha(\omega_a)$ is small, the four-level system still causes an appreciable relative phase change in the photon state when ratio $v_c/\gamma_{41}$ is properly selected. As described further below, this property allows one-qubit gate 400A, 400B, or 400C to act as a tunable phase shifter.

Figure 5C:
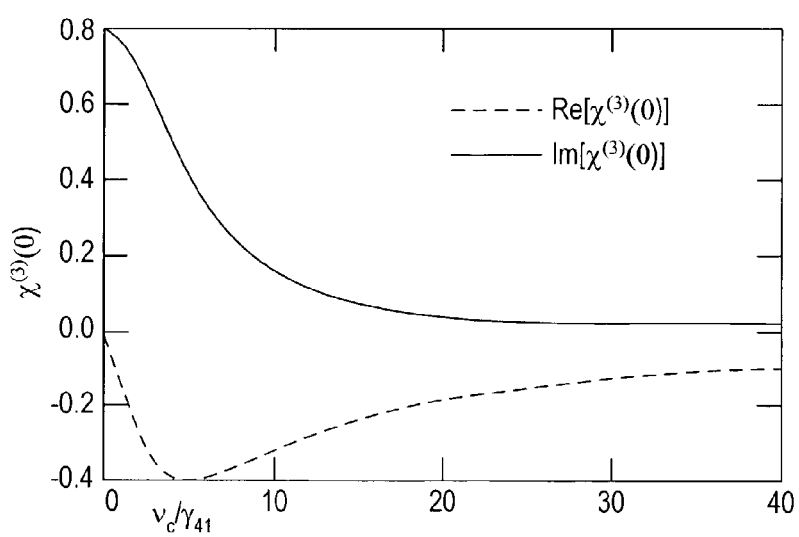

FIG. 5C illustrates the behavior of the third-order susceptibility $\chi$ of FIG. 5B as a function of the normalized detuning $v_c/\gamma_{41}$ when detuning parameter $v_a$ is zero. Note that as detuning parameter $v_c$ approaches zero, a large relative absorption arises at the probe frequency $\omega_a$ (which is useful for a "quantum switch"), and that large values of detuning parameter $v_c$ cause a phase shift that is substantial relative to the small absorption (which is useful for a "quantum phase-shifter").

EIT suitable for quantum information processing as described above should provide transparency, maintain coherence, and avoid spontaneous emissions that affect entangled photonic qubits. The control fields deplete the population of the second energy level of the four-level matter system and provide transparency. Operating the system at a sufficiently low temperature, e.g., below about 4° K, may suppress dephasing as a source of decoherence. The four-level systems are chosen so that the first and third energy levels are metastable in that neither the first nor third energy level has single-photon spontaneous emissions. Control of spontaneous emissions from the second energy level is unnecessary because effective detuning $v'_c$ can be scaled to achieve the desired value for the ratio in Equation 15. However, spontaneous emissions from the fourth energy level causes decoherence in entangled photonic qubits. Increasing the magnitude of the detuning parameter $v_c$ to a very large value would reduce the entanglement of the photonic qubit but would also reduce the phase shift introduced by the EIT system. In accordance with an aspect of the invention, a structure for interacting probe photons with a four-level system includes a mechanism for suppressing spontaneous emissions from the fourth energy level to reduce the decoherence rate $\gamma_{40}$.

Figure 6A:
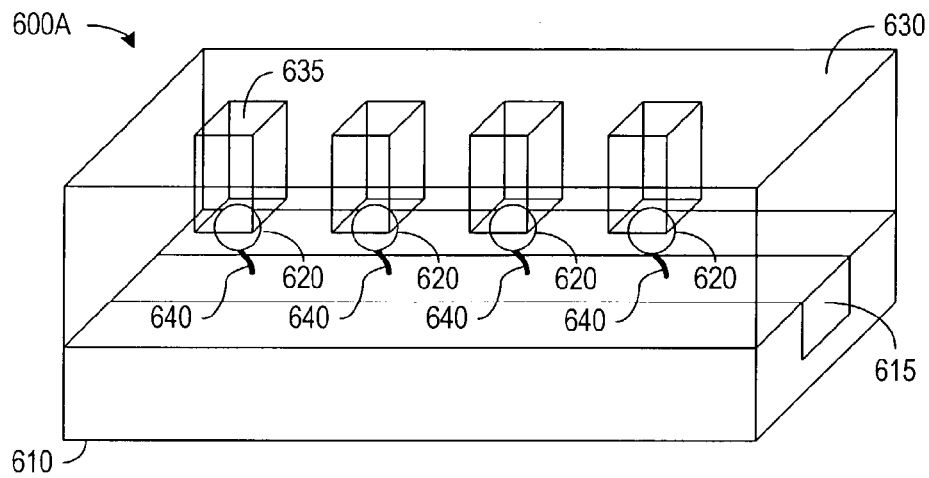
FIGS. 6A and 6B illustrate structures in accordance with alternative embodiments of the invention for interacting an evanescent field of a probe photon in a waveguide with a matter system.

FIG. 6A illustrates a structure 600A that enables interactions of probe photons with a four-level matter system and suppresses spontaneous emissions from the fourth energy level of interaction sites. Structure 600A includes a substrate 610 of a material such as a photonic bandgap crystal, silica, or another optical material containing a waveguide 615. Equivalently, waveguide 615 could be the core of an optical fiber having cladding corresponding to substrate 610. Waveguide 615 guides the probe photons, which have angular frequency $\omega_a$. In one embodiment, waveguide 615 is made of a photonic bandgap crystal in which photons of angular frequency $\omega_a$ (and in some embodiments of control frequency $\omega_b$) can propagate but photons having angular frequencies $\omega_{14}$ and $\omega_{34}$ corresponding spontaneous emissions from the fourth energy level of interactions sites 620 cannot.

Interaction sites 620, each of which has four accessible energy levels related as illustrated in FIG. 3A or 3C, are positioned to interact with photons traveling along waveguide 615. For this purpose, interaction sites 620 can be placed inside waveguide 615 or outside waveguide 615 (as illustrated in FIG. 6A), where interaction sites 620 interact with the evanescent field of the traveling photons. Each interaction site 620 can be an atom (e.g., a calcium (Ca) atom, a praseodymium (Pr) atom, or another heavy atom), a molecule, or any other system that interacts with photons and has four accessible energy levels. The angular frequency (ha of the probe pulse and the angular frequencies $\omega_b$ and $\omega_c$ or $\omega_d$ of the control fields are generally selected according to the energy levels of interaction sites 620.

Molecular tethers 640 that adhere to substrate 610 confine interaction sites 620 near the surface of substrate 610. Molecular tethers 620 can be polymers or other materials that are well known for immobilizing molecules, particularly organic molecules. Molecular tethers are further described, for example, in Gray et al., "Nonequilibrium Phase Behavior During the Random Sequential Adsorption of Tethered Hard Disks," Phys. Rev. Lett., 85, 4430-4433, and in Gray et al., "Microstructure Formation and Kinetics in the Random Sequential Adsorption of Polydisperse Tethered Nanoparticles Modeled as Hard Disks," 2001 Langmuir, 17, 2317-2328. The structure of each molecular tether 640 is preferably chosen to critically damp phonons excited in tether 640 and to filter phonons created in substrate 610. The molecular tether is preferably transparent to the probe and control field photons.

Figure 6B:
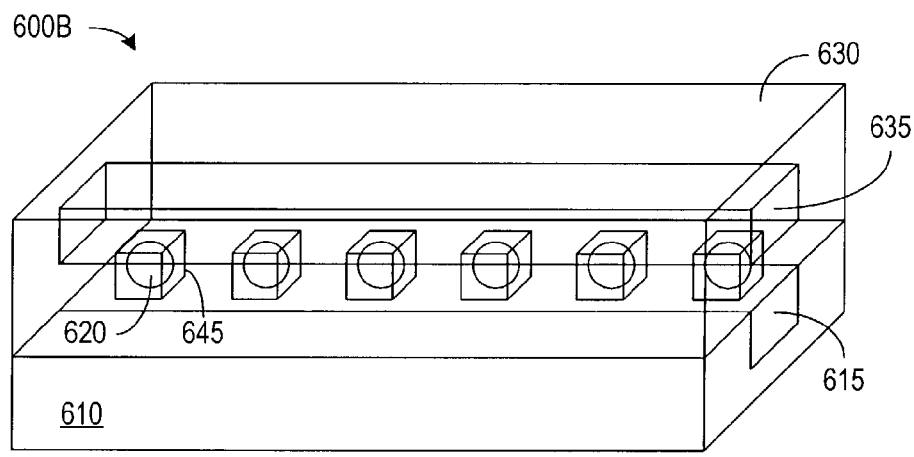

FIG. 6B shows an alternative structure 600B in which molecular cages 645 hold respective interaction sites 620 in fixed locations. Molecular cages 645 can be carcerands, carceplexes, endohedral fullerenes, or similar molecular structures. Such structures are well-known in the art and are described, for example, in D. J. Cram, "Molecular Container Compounds" Nature 356 (6364), 29-36 Mar. 5, 1992, which is hereby incorporated by reference in its entirety. The specific compound used for molecular cage 645 is preferably transparent to the probe and control field photons and will generally be selected for the specific atom or molecule used for interactions sites 620. Cooling may be beneficial in inducing interaction sites 620 into an s-type ground state that minimizes the interaction between interaction sites 620 and the "walls" of molecular cages 645.

Using electromagnetically induced transparency of four-level interaction sites 620 for quantum information systems will benefit from suppression of spontaneous emissions from the fourth energy level of interaction sites 620 for reasons given above. To suppress these spontaneous emissions, structures 600A and 600B further include a photonic bandgap crystal 630, where interaction sites 620 and their associated confinement structures 640 or 645 are at point defects in photonic bandgap crystal 630. Photonic bandgap crystals are well known, and bandgap crystal 630 can be fabricated using a variety of known techniques. One fabrication technique constructs a photonic bandgap crystal through repeated formation of thin dielectric films on interaction sites 629 to create a periodic dielectric material that suppresses propagation of light of the selected frequency or frequencies. Photonic bandgap crystal 630 has a structure that forbids propagation of photons having angular frequencies $\omega_{14}$ and $\omega_{34}$ corresponding to the transitions from the fourth energy level to the first and third energy levels, respectively.

Photonic bandgap crystal 630, which forbids propagating photons of angular frequencies $\omega_{14}$ and $\omega_{34}$, will generally also block input of control fields having angular frequency $\omega_c$, which is about equal to angular frequency $\omega_{34}$ when detuning parameter $v_c$ is small. Defects 635 in bandgap crystal 630 permit application of control field photons of angular frequency $\omega_c$ to interaction sites 620. Defects 635 can have a variety of geometries. FIG. 6A, for example, illustrates a configuration having separate light pipes to respective interaction sites 620. FIG. 6B illustrates a configuration where a single waveguide provides control field photons to multiple interaction sites. The particular configuration for defects 635 in photonic bandgap crystal 630 will generally be designed according to the competing goals of minimizing undesirable spontaneous emissions while still permitting application of control fields of angular frequency $\omega_b$. Application of control field photons of angular frequency $\omega_b$ to interaction sites 620 can be via defects 635 or waveguide 615 in different embodiments.

Defects 635 can be permanent defects created as regions of a material that permits propagation of photons having the control angular frequency $\omega_c$ (and in some embodiments photons having control angular frequency $\omega_b$.) Alternatively, defects 635 in photonic bandgap crystal 630 can be temporary defects that are turned on and off rapidly (electronically or otherwise). The electrooptic effect provides one mechanism for turning a defect on and off. (See A. Yariv, "Optical Electronics in Modern Communications," 5th ed. (Oxford, 1997).)

Defects 635 in photonic bandgap crystal 630 permit a laser or other external source of the control fields to direct photons of angular frequency $\omega_c$ through line defect 635 to interaction sites 620. When angular frequencies $\omega_c$ and $\omega_{34}$ are nearly equal, defects 635 will also permit light of angular frequency $\omega_{34}$ to escape from crystal 630, but the properties of crystal 630 and defects 635 can still be selected to block propagation of light having angular frequency $\omega_{14}$. Even with defects 635, photonic bandgap crystal 630 suppresses spontaneous emissions from the fourth energy level by reducing the density of states available for spontaneously emitted photons. The geometry and properties of defects 635 can be optimized to permit application of control fields while minimizing the available states for spontaneous emissions. The spontaneous emission contribution to decoherence rate 741 thus can be made small, which is essential for operation of quantum gates.

In the embodiments of FIGS. 6A and 6B, the number of interaction sites 620 is selected so that the accumulative effect of the interactions, e.g., the attenuation or phase change in the probe photon state, reaches the desired level. The level of interaction depends on the amount of time during which the photons interact with interaction sites 620. Increasing the number of interaction sites 620 effectively increases the interaction time between the probe photons and the four-level system.

Figure 7:
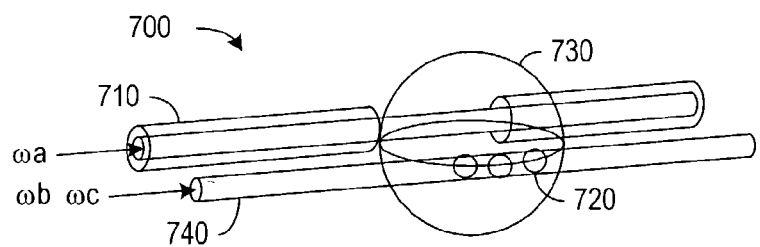
FIG. 7 illustrates a structure in accordance with an embodiment of the invention using a whispering gallery mode for coupling an evanescent field of photons in an optical fiber to a matter system.

FIG. 7 shows a structure 700 that uses a "whispering gallery" to increase the interaction time of the probe photons with interaction sites 720. Structure 700 includes an optical fiber 710, interaction sites 720, and a silicon microsphere 730. Optical fiber 710 carries the probe photons, and silica microsphere 730, which adjacent the core of optical fiber 710, captures photons from the evanescent field of optical fiber 710. Interaction sites 720 can be confined near the surface of silica sphere 730 using molecular tethers or molecular cages as described above in regard to FIGS. 6A and 6B. Structure 700 also includes a photonic bandgap crystal (not shown) that surrounds interaction sites 720 to suppress spontaneous emissions.

Microsphere 730 has a diameter that is many (e.g., typically about 10) times the wavelength of the probe photons and is positioned to couple to the evanescent field surrounding the core of optical fiber 710. As a result, microsphere 730 provides a resonator with a high Q-factor, allowing for long interaction times between the probe photons and interaction sites 720 before the probe photons return to optical fiber 710. Control fields are incident on interaction sites 720 via a waveguide or path 740.

The one-qubit gates 400A, 400B, and 400C of FIGS. 4A, 4B, and 4C can use any of the structures of FIG. 6A, 6B, or 7 as four-level system 410 when implementing a switch or a quantum phase-shifter. The switch is operated through external control of the control fields. If the control fields provide at the interaction site a photon having angular frequency $\omega_c$ that is about equal to resonant frequency $\omega_{32}$ and a photon having angular frequency $\omega_b$ equal to resonant frequency $\omega_{42}$, then the four-level matter system has a high probability of absorbing a probe photon having angular frequency $\omega_a$ equal to $\omega_{31}$. Otherwise, the probe photon will be transmitted.

Switching of conventional optical data or photonic qubits is thus possible using the same structure. In particular, using structure 400A of FIG. 4A, when angular frequency $\omega_b$ is tuned to a resonance (i.e., $\omega_b=\omega_{32}$) of four-level matter system 410, tuning angular frequency $\omega_c$ to the resonance (i.e., $\omega_c=\omega_{42}$) turns off an optical signal having an angular frequency $\omega_a$. Detuning angular frequency $\omega_c$ (e.g., so that ratio $v_c/\gamma_{41}$ is in a range between about 10 and 100) causes EIT, so that matter system 410 transmits the optical data signal. Similarly, when a photonic qubit contains a component state of angular frequency $\omega_a$ that interacts with matter system 410, the component state can be switched (i.e., selectively transmitted or absorbed) in a quantum coherent manner.

The structures 400A, 400B, and 400C of FIGS. 4A, 4B, and 4C can also implement tunable phase shifters for photonic qubits. A single Fock state tunable phase shifter, for example, transforms an initial state |Qin> of the form $c_0$|Q0>+$c_1$|Q1> (where |Q0> and |Q1> are Fock states of photons having angular frequency $\omega_a$) to an output state |Qout> of the form $c_0$|Q0>+$c_1 e^{i\theta}$|Q1>. Four-level system 410 introduces a phase shift $\theta$ for the state |Q1>, where $\theta$ depends on the control fields and the number of interaction sites. Structure 400A of FIG. 4A has qubit component states |Q0> and |Q1> that correspond to the absence or presence of a single photon pulse of angular frequency $\omega_a$, which is in the 1-2 channel of four-level matter system 410.

One qubit gate 400B of FIG. 4B can use qubit component states |Q0> and |Q1> that are single photon states both having angular frequency $\omega_a$. States |Q0> and |Q1> also have a property (e.g., polarization) that allows beamsplitter 430 to spatially separate states |Q0> and |Q1>. The interaction of state |Q1> in four-level matter system 410 then causes the phase shift $\theta$ relative to state |Q0>.

A photon in state |Q1>, for either one-qubit gate 400A or 400B, passes (or cycles) through the four-level interaction sites inside matter system 410 for a time sufficient to establish the desired relative phase between the logical qubit states |Q0> and |Q1>. One-qubit gate 400C passes (or cycles) both qubit component states |Q1> and |Q0> through respective four-level matter systems 410 and 410'. In one configuration, one-qubit gate 400C shifts the phase of each state |Q1> and |Q0> by $\theta/2$ so that output state |Qout> has the form $c_0 e^{-i\theta/2}$|Q0>+$c_1 e^{+i\theta/2}$|Q1>. Since each of the four-level matter systems 410 and 410' only provides half of the phase shift that the four levels systems in one-qubit gates 400A and 400B provide, the interaction time is similarly cut in half, which can reduce the required coherence time.

The introduced phase shift $\theta$ of the one-qubit gates is tunable up to order $\pi$. The magnitude of the phase is tunable not only by the number of cycles through the interaction sites but also through the strength and/or frequency of the control fields applied to a different transition of the interaction sites. This allows an extremely precise phase shift $\theta$ to be established. Decoherence (and especially dephasing) should be kept to a level such that the gate operates with a high fidelity when compared to the ideal gate for the same phase shift $\theta$, for the desired tunable range of phase shifts between 0 and $\pi$. The use of a photonic bandgap material described above can help suppress dephasing. The tunable single photon phase shifter is one of the most useful quantum gates for linear optics quantum information processing.

A tunable phase shifter can also be implemented for qubit state $|Q1\rangle$ that is a coherent state $|\alpha(t)\rangle$ rather than a Fock state containing a definite number of photons. A coherent state is defined above in Equations 7. In an exemplary system, the coherent state typically has 3 to 5 as a mean number $n_V$ of photons. Similar to the Fock state case, the coherent state transforms from an initial state $|Qin\rangle$ of the form $c_0|Q0\rangle + c_1|Q1\rangle$ to an output state $|Qout\rangle$ of the form $c_o|Q0\rangle + c_1 e^{i\theta}|Q1\rangle$, where the logical states $|Q0\rangle$ and $|Q1\rangle$ correspond to the absence or presence of a coherent state pulse (with amplitude a) in the 1-2 channel of the four-level matter system. A phase shift $\theta$ is introduced on the $|Q1\rangle$ state. No phase shift occurs on the $|Q0\rangle$ state.

The structure 400A of FIG. 4A can implement a coherent state phase shifter in which coherent pulse $|\alpha(t)\rangle$ is cycled through the four-level interaction sites for sufficient time to establish the desired relative phase shift $\theta$ between states $|Q0\rangle$ and $|\alpha(t)\rangle$. This gate operates on arbitrary input superpositions of the logical basis states (or cat states) and is extremely useful for coherent state quantum information processing. Again, decoherence should be minimized.

Figure 8A:
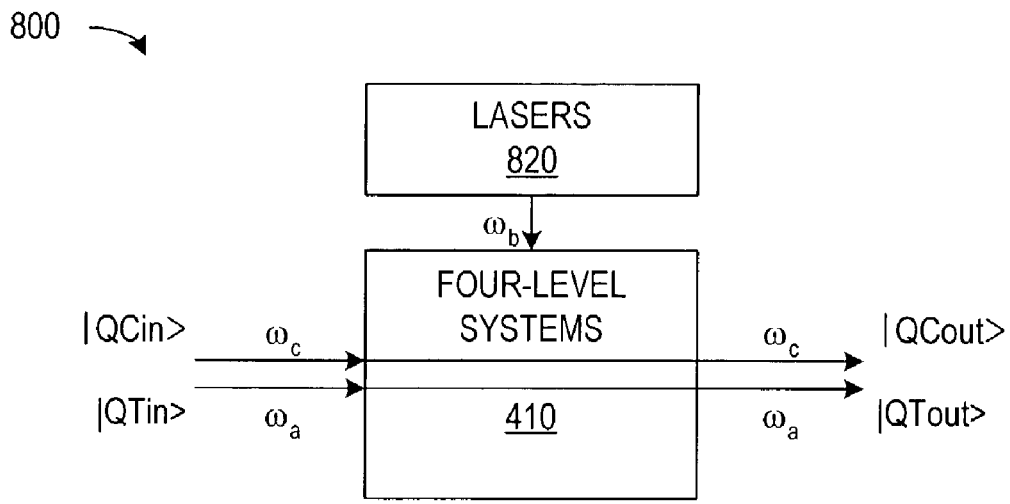
FIGS. 8A and 8B are block diagrams of two-qubit gates in accordance with alternative embodiments of the invention.

The EIT properties of the four-level matter systems described herein can also implement two-qubit gates and conditional optical switches. FIG. 8A illustrates an exemplary structure 800 capable of operating as a two-qubit gate in accordance with an embodiment of the invention. Structure 800 includes a four-level matter system 410 and a laser 820 or another electromagnetic source that applies a control field. As input signals, structure 800 has a target qubit $|QTin\rangle$ and a control qubit $|QCin\rangle$. The illustrated structure 800 uses photons of respective angular frequencies $\omega_a$ and $\omega_c$ for the target and control qubits and photons of angular frequency $\omega_b$ for the control field from laser 820. In an alternative embodiment of the invention, the roles of photons of angular frequencies $\omega_b$ and $\omega_c$ can be reversed so that the control qubit corresponds to photons of angular frequency $\omega_b$ and the control field from laser 820 contains photons of angular frequency $\omega_c$. In yet another alternative embodiment of the invention, the control qubit corresponds to photons of angular frequency $\omega_b$ and the control field from laser 820 contains photons of angular frequency $\omega_d$.

When input qubits $|QTin\rangle$ and $|QCin\rangle$ are replaced with classical optical signals Tin and Cin of appropriate angular frequencies $\omega_a$ and $\omega_c$, structure 800 operates as a conditional optical switch that transmits optical signal Tin when optical signal Cin (and the control field) contains photons of the angular frequencies that provide EIT. Signal Cin thus controls transmission of signal Tin. The switching capabilities of structure 800 are similarly applicable to photonic qubits $|QTin\rangle$ and $|QCin\rangle$.

When structure 800 of FIG. 8A operates as a two-qubit phase gate, each of the input qubits $|QTin\rangle$ and $|QCin\rangle$ can be arbitrary superpositions of respective "photon present" states $|Q_T1\rangle$ and $|Q_C1\rangle$, which are one-photon Fock states for frequencies $\omega_a$ and $\omega_c$, and respective "photon not present" states $|Q_T0\rangle$ and $|Q_C0\rangle$, which are zero-photon Fock states for frequencies $\omega_a$ and $\omega_c$.

Structure 800 can implement a conditional or controlled phase gate for two photonic qubits, which is useful for quantum information processing with single photons. For the controlled phase gate, an input product state $|QCin\rangle \otimes |QTin\rangle$ and an output product state $|QCout\rangle \otimes |QTout\rangle$ satisfy Equations 18. A phase shift $\theta$ occurs only on state $|Q_C1\rangle|Q_T1\rangle$ because only state $|Q_C1\rangle|Q_T1\rangle$ provides photons of both angular frequencies $\omega_a$ and $\omega_c$ that permit four-level matter system 810 to induce a phase shift. For the special case when the phase shift $\theta$ is equal to $\pi$, this two-qubit gate is called a phase gate and is equivalent (up to local unitary transformations) to the controlled not (CNOT) gate, which is one of the fundamental gates used in quantum information processing.

$$|QCin\rangle \otimes |QTin\rangle = c_0|Q_C1\rangle|Q_T1\rangle + c_1|Q_C1\rangle|Q_T1\rangle + c_2|Q_C1\rangle|Q_T1\rangle + c_3|Q_C1\rangle|Q_T1\rangle$$

$$|QCout\rangle \otimes |QTout\rangle = c_0|Q_C1\rangle|Q_T1\rangle + c_1|Q_C1\rangle|Q_T1\rangle + c_2|Q_C1\rangle|Q_T1\rangle + c_3 e^{i\theta}|Q_C1\rangle|Q_T1\rangle$$

Equations 18

Figure 8B:
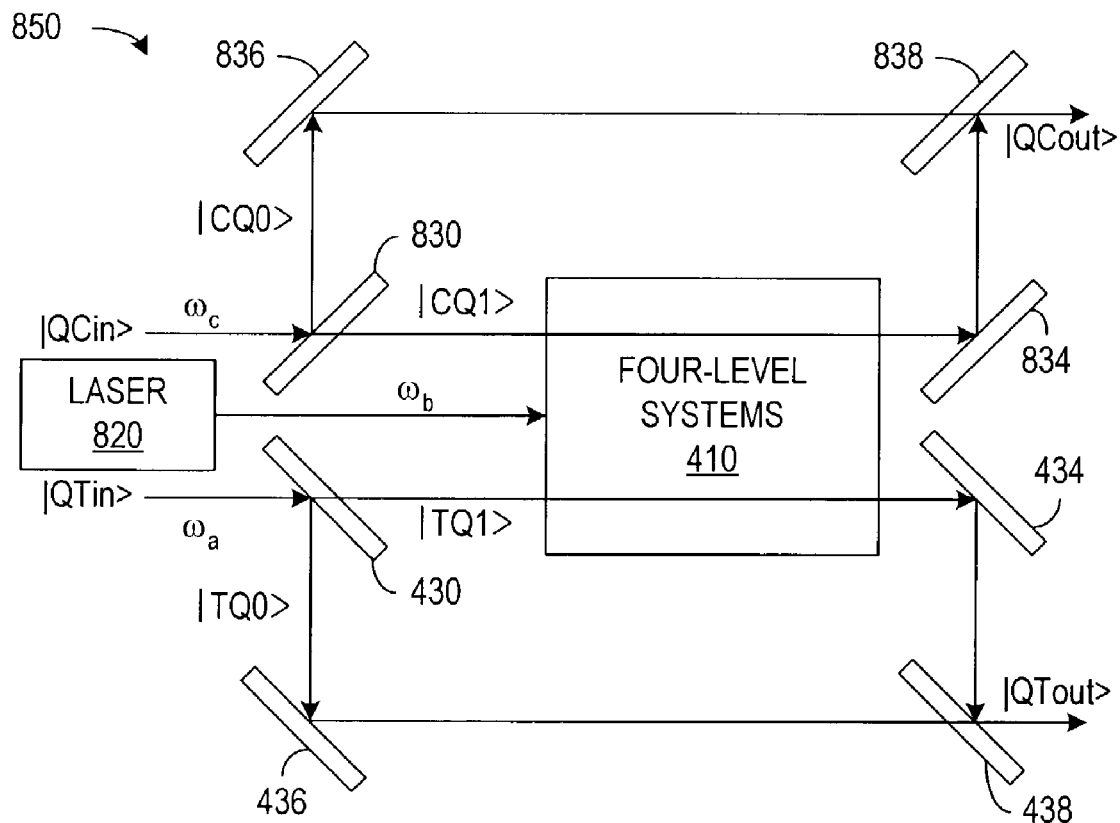

In structure 800 of FIG. 8A, the logical states 0 and 1 for the control and target qubits are represented by either a vacuum or a single photon. The zero photon state may correspond to a single photon pulse in some alternative spatial or polarization rail. FIG. 8B, for example, illustrates an exemplary structure 850 for a two-qubit gate that separates component states of qubits according to photon polarization. Structure 850 includes: a four-level matter system 410 as described above; a laser 820 that produces a control field; polarizing beamsplitters 430 and 438 and reflectors 434 and 436 that separate and direct the target photons of different polarizations; and polarizing beamsplitters 830 and 838 and reflectors 834 and 836 that separate and direct the control photons of different polarizations. Polarizing beamsplitter 430 splits target qubit $|QTin\rangle$ according to polarization to spatially separate component states $|Q_T1\rangle$ and $|Q_T0\rangle$, and input beamsplitter 830 similarly splits control qubit $|QCin\rangle$ according to polarization to spatially separate component states $\beta Q_C1\rangle$ and $|Q_C0\rangle$. In this embodiment, states $|Q_T0\rangle$ and $|Q_T1\rangle$ correspond to different orthogonal polarizations of a photon of angular frequency $\omega_a$, and states $|Q_C0\rangle$ and $|Q_C1\rangle$ correspond to different orthogonal polarizations of a photon of angular frequency $\omega_c$. In structure 850, state $|Q_T1\rangle$ interacts with four-level matter system 410, but state $|Q_T0\rangle$ does not. Similarly, state $|Q_C1\rangle$ controls interactions of state $|Q_T1\rangle$ with four-level matter system 410, but state $|Q_C0\rangle$ does not.

Control qubit $|QCin\rangle$ is input in the 3-4 channel of four-level system 410, while target qubit $|QTin\rangle$ is input into the 1-2 channel. The pulses are arranged so that four-level system 410 only makes a 1-2 transition if both photons are present (one photon in each of control state $|Q_C1\rangle$ and target state $|Q_T1\rangle$). The system cycles photons for sufficient time to establish the relative phase $\theta$. The magnitude of phase $\theta$ is tunable not only by the number of interaction sites in four-level system 410 but also through the strength and/or frequency $\omega_b$ of an external classical field that laser 820 applies to a different transition in four-level system 410. Phase $\theta$ can thus be tuned to any value up to or greater than $\pi$. For a conditional phase shift of $\pi$, gate 850 forms a universal two-qubit gate, capable of maximally entangling two initially unentangled photonic qubits. The tunability of the phase gives additional flexibility.

Figure 9:
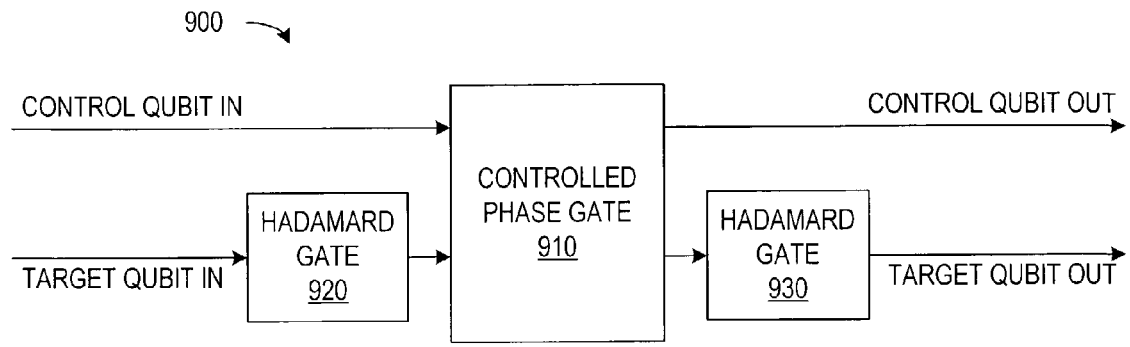
FIG. 9 is a block diagram of a CNOT gate employing a controlled phase gate in accordance with an embodiment of the invention.

A CNOT gate can be created from fundamental gates and beam splitters. FIG. 9 illustrates a CNOT gate 900 implemented using a controlled phase gate 910 and two Hadamard gates 920 and 930. Controlled phase gate 910 can be implemented using structure 850 of FIG. 8B when the operating parameters for structure 850 are selected so that the phase shift θ is equal to π. Hadamard gates 920 and 930, which operate on polarization-encoded target qubits, perform a Hadamard transform and can be implemented using known linear optical elements such as beamsplitters, polarizers, phaseshifters, or holograms. Hadamard gate 920, for example, acts on target qubit component states $|Q_T0\rangle$ and $|Q_T1\rangle$ as indicated in Equations 19.

$$\text{Equations 19: } |Q_T0\rangle \rightarrow \frac{1}{\sqrt{2}}(|Q_T0\rangle + |Q_T1\rangle)$$

$$|Q_T1\rangle \rightarrow \frac{1}{\sqrt{2}}(|Q_T0\rangle - |Q_T1\rangle)$$

E. Knill, R. La amme, and G. J. Milburn, Nature 409, 46 (2001) introduced a construction of a CNOT gate using a gate known as a nonlinear sign shift gate. Basically, the nonlinear sign shift gate takes an input state $|IN\rangle$ of the form $c_0|0\rangle + c_1|1\rangle + c_2e^{i\theta}|2\rangle$ to an output state $|OUT\rangle$ of the form $c_0|0\rangle + c_1|1\rangle + c_2e^{i\theta}|2\rangle$, where states $|0\rangle$, $|1\rangle$, and $|2\rangle$ are respectively zero-photon, one-photon, and two-photon Fock states.

Figure 10A:
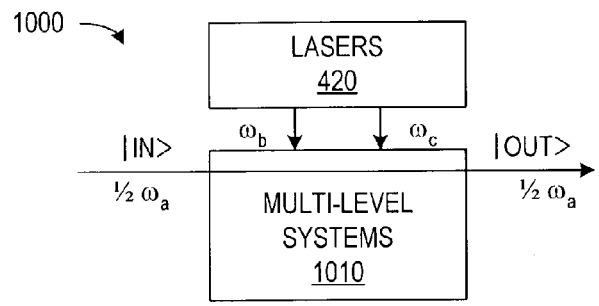
FIG. 10A is a block diagram of a two-photon phase shifter in accordance with an embodiment of the invention.

In accordance with an aspect of the invention, a two-photon phase shifter implemented using photonic qubits and a four-level (or five-level) matter system operates as a nonlinear sign shift gate in a special case where the phase shift θ is equal to π. FIG. 10A shows a two-photon phase shifter 1000 in accordance with an embodiment of the invention. Two-photon phase shifter 1000 includes a multi-level systems 1010 that can be structurally the same as four-level system 410 of FIG. 4A, but two-photon phase shifter 1000 has an input state $|IN\rangle$ that uses photons having an angular frequency $\frac{1}{2}\omega_a$. Multi-level systems 1010 have at least the four energy levels illustrated in FIG. 3A or 3C. Since the probe photons have only one-half the energy associated with the transition between the first and second energy levels in the multi-level matter system 1010, only the two-photon component state $|2\rangle$ has sufficient energy to excite the EIT process that introduces a phase shift.

In one variation of the two-photon phase shifter 1000, multi-level matter system 1010 has a fifth energy level that is approximately halfway between the first and second energy levels. With this optional configuration, the one-photon Fock state $|1\rangle$ interacts with matter system 1010. An advantage of this configuration is that the interaction delays for the one-photon state and the two-photon state in matter system 1010 will better match so that photon pulses exit matter system 1010 at the same time regardless of the number of photons. Timing delay is generally not a concern for the zero-photon state (e.g., the vacuum state). The output one-photon Fock state $|1\rangle$ will not have a significant phase shift unless multi-level system 1010 has additional energy levels and applied control fields that are selected to induce a phase shift in the one-photon Fock state $|1\rangle$.

Figure 10B:
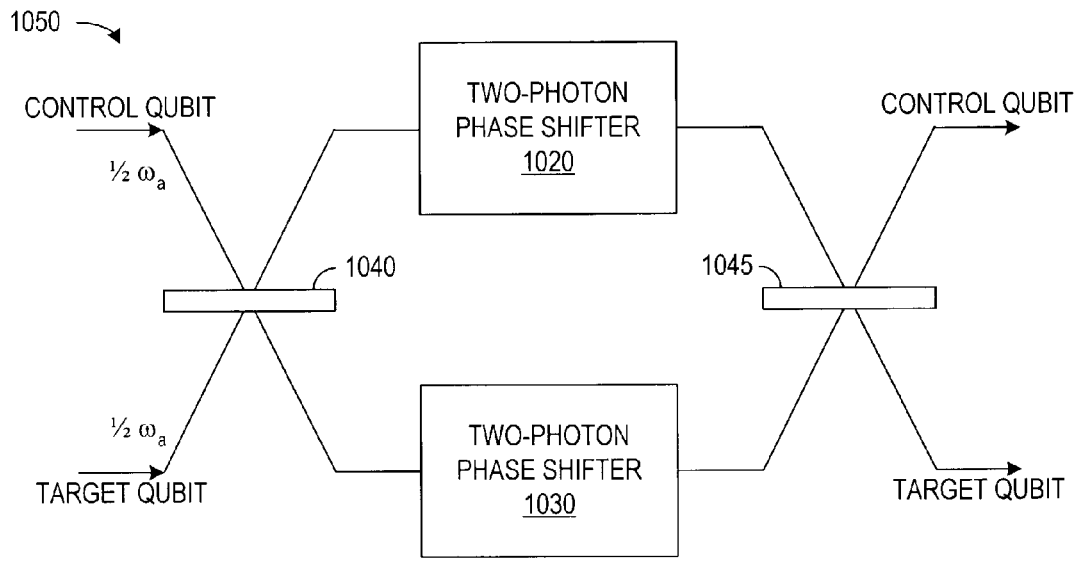
FIG. 10B is a block diagram of a controlled phase gate constructed using two-photon phase shifters such as illustrated in FIG. 10A.

FIG. 10B illustrates a two-qubit phase gate 1050 implemented using a pair of two-photon phase shifters 1020 and 1030. In controlled phase gate 1050, both the target qubit and the control qubit have component states corresponding to the presence or absence of a photon having angular frequency ½ω$_a$. The qubit states are unpolarized having an equal probability of having any particular linear polarization. A polarizing beam splitter 1040 combines a reflected portion of the target qubit with a transmitted portion of the control qubit, and the resulting combination is input to two-photon phase shifter 1030. Similarly, polarizing beam splitter 1040 combines a transmitted, portion of the target qubit with a reflected portion of the control qubit, and this resulting combination is input to two-photon phase shifter 1020. In two-photon phase shifters 1020 and 1030, only the component state including photon-present states for both the control and target qubits acquires a phase shift (i.e., a sign change). A polarizing beamsplitter 1045 separates photons corresponding to the control qubit from photons corresponding to the target qubits.

In accordance with yet another aspect of the present invention, a Bell state detector can employ a CNOT gate implemented using a two-qubit phase gate that can be implemented with or without two-photon phase shifters. Bell states are generally entangled states arising from qubit interactions, and CNOT gates are known to be able to partly unentangle Bell states. Column 1 of Table 1 lists unnormalized Bell states that may arise from entanglement of a target qubit having component states $|Q_T0\rangle$ and $|Q_T1\rangle$ and a control qubit having component states $|Q_C0\rangle$ and $|Q_C1\rangle$.

TABLE 1

Results of Applying Detector to Bell States

| | Input Bell State | Output from CNOT Gate | After Hadamard Gate |
|---|---|---|---|
| 0. | $|Q_C0\rangle|Q_T0\rangle+|Q_C1\rangle|Q_T1\rangle$ | $[|Q_C0\rangle+|Q_C1\rangle]\otimes|Q_T0\rangle$ | $|Q_C0\rangle\otimes|Q_T0\rangle$ |
| 1. | $|Q_C0\rangle|Q_T0\rangle-|Q_C1\rangle|Q_T1\rangle$ | $[|Q_C0\rangle-|Q_C1\rangle]\otimes|Q_T0\rangle$ | $|Q_C1\rangle\otimes|Q_T0\rangle$ |
| 2. | $|Q_C0\rangle|Q_T1\rangle+|Q_C1\rangle|Q_T0\rangle$ | $[|Q_C0\rangle+|Q_C1\rangle]\otimes|Q_T1\rangle$ | $|Q_C0\rangle\otimes|Q_T1\rangle$ |
| 3. | $|Q_C0\rangle|Q_T1\rangle-|Q_C1\rangle|Q_T0\rangle$ | $[|Q_C0\rangle-|Q_C1\rangle]\otimes|Q_T1\rangle$ | $|Q_C1\rangle\otimes|Q_T1\rangle$ |

Figure 11A:
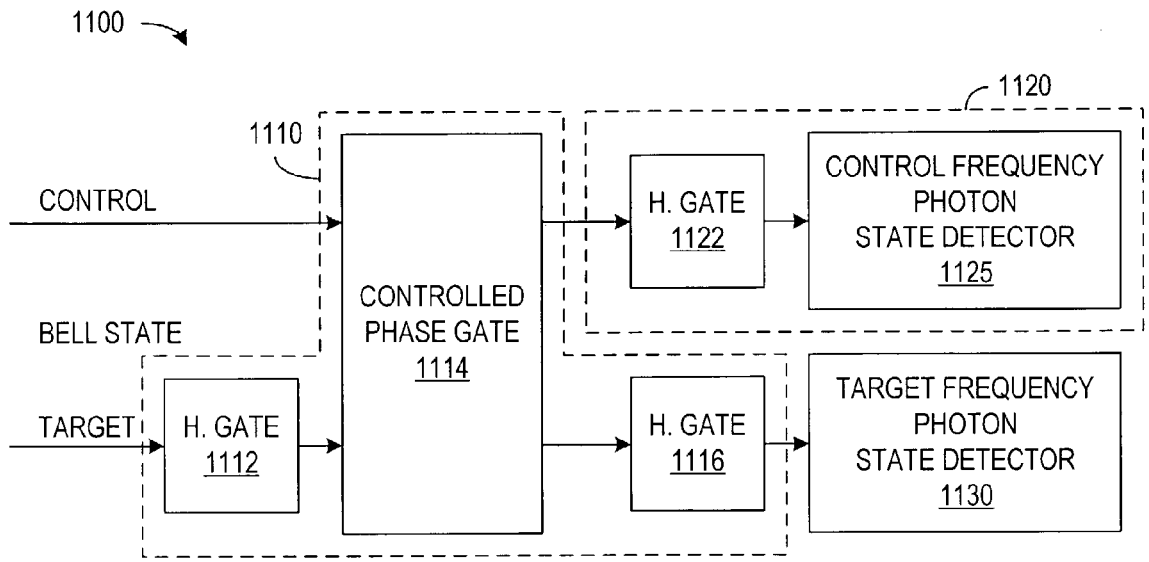
FIGS. 11A and 11B are block diagrams of Bell state detectors in accordance with alternative embodiments of the invention.

FIG. 11A illustrates a Bell state detector 1100 in accordance with an embodiment of the invention. Bell state detector 1100 includes a CNOT gate 1110, a photon state detector 1120 for photons having the frequency used in the control qubit, and a photon state detector 1130 for photons having the frequency used in the target qubit. CNOT gate 1110 includes two Hadamard gates 1112 and 1116 and a controlled phase gate 1114. Other implementations of the CNOT gate 1110 are suitable for Bell state detector 1110. As described above, CNOT gate 1110 (and a controlled phase gate 1114) can be constructed for a control qubit employing photons of angular frequency $\omega_c$ or $\omega_b$ (or ½ω$_a$) and a target qubit employing photons of angular frequency $\omega_a$ (or ½ω$_a$). For the specific embodiment of FIG. 11A, each of the control and target qubits for detector 1100 is encoded using component states corresponding to the absence or presence of a photon of the corresponding frequency. Column 2 of Table 1 indicates the results of applying CNOT gate 1110 to the Bell states listed in column 1 of Table 1.

Photon state detector 1120 measures the output state of the CNOT gate to determine the state of the photon having the control frequency (e.g., $\omega_c$, $\omega_b$ or ½ω$_a$), and photon state detector 1130 measures the output state of the CNOT gate to determine the state of a photon having the target frequency (e.g., $\omega_a$ or ½ω$_a$). In FIG. 11A, photon state detector 1120 includes a Hadamard gate 1122 and a photon detector 1125. Hadamard gate 122 operates on the control photons to provide the resultant states in column 3 of Table 1.

Bell state detector 1100 identifies the original input Bell state from the measurements that photon state detectors 1120 and 1130 perform. In particular, if detector 1120 measures a photon corresponding to state $|Q_C0\rangle$, the original input state was either Bell state 1 or 3 of Table 1. If detector 1120 measures a photon corresponding to state $|Q_C1\rangle$, the original input state was either Bell state 2 or 4 of Table 1. If detector 1130 measures a photon corresponding to state $|Q_T0\rangle$, the original input state was either Bell state 1 or 2 of Table 1, and if detector 1130 measures a photon corresponding to state $|Q_T1\rangle$, the original input state was either Bell state 3 or 4 of Table 1. Accordingly, the measurements from state detectors 1120 and 1130 indicate a 2-bit digital value that uniquely identifies the input Bell state.

Figure 11B:
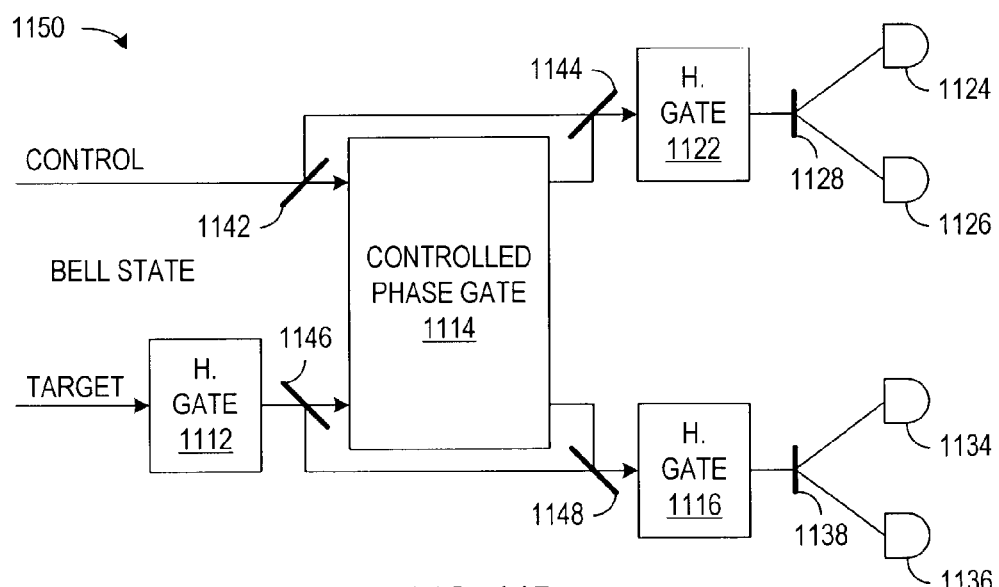

Bell state detector 1100 can be modified in a variety of ways in keeping with the present invention. For example, the control and target qubits can be encoded using component states corresponding to measurably distinguishable properties such as photons with different polarizations, spin, or momentum. FIG. 11B illustrates an exemplary Bell state detector 1150 in which qubits use polarization encoding. Bell state detector 1150 uses polarizing beam splitters 1142 and 1144 to separate and recombine the polarization components of the control qubit and polarizing beam splitters 1146 and 1148 to separate and recombine the polarization components of the target qubit. As a result, only the state $|Q_C1\rangle|Q_T1\rangle$ acquires a sign change through controlled phase gate 1114. For photon state measurements, polarizing beam splitters 1128 and 1138 separate the polarization components of the output control and target qubits, respectively. Photon detectors 1124 and 1126 then measure the presence or absence of photons in the two polarization channels of the control qubit, and photon detectors 1134 and 1136 measure the presence or absence of photons in the two polarization channels of the target qubit. The original input Bell state is determined from the four measurement results from photon detectors 1124, 1126, 1134, and 1136.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. A quantum information processing system comprising:
    a matter system having a first energy level, a second energy level, a third energy level, and a fourth energy level;
    a source of a photonic qubit that has a first frequency that provides a coupling between the first energy level and the second energy level;
    a waveguide arranged to receive the photonic qubit, and to direct the photonic qubit for a quantum coherent interaction with the matter system that causes the photonic qubit to undergo a phase shift; and
    a source of electromagnetic control fields that include a photon having a second frequency that provides a coupling between the third energy level and the second energy level and a photon having a third frequency that provides a coupling between the third energy level and the fourth energy level.

2. The system of claim 1, wherein the source of the electromagnetic control fields allows adjustment of one of the second and third frequencies to alter the phase shift that the matter system induces in a component of the photonic qubit.

3. The system of claim 1, wherein the photonic qubit is a linear combination of a first basis state containing a first definite number of photons and a second basis state containing a second definite number of photons.

4. The system of claim 1, wherein the photonic qubit has a value represented by a coherent state.

5. The system of claim 1, further comprising a suppressive system that operates to suppress spontaneous emissions from the matter system.

6. The system of claim 5, wherein the fourth energy level is higher than the first energy level, and the suppressive system suppresses spontaneous emissions resulting from a transition of the matter system from the fourth energy level.

7. A quantum information processing method comprising:
    directing a quantum information signal for interaction with a matter system, wherein the quantum information signal uses photons having a first frequency that provides a coupling between a first energy level and a second energy level of the matter system, and wherein an interaction of the quantum information signal and the matter system implements a quantum information processing function; and
    applying electromagnetic fields that use photons having a second frequency that provides a coupling between a third energy level and the second energy level of the matter system and photons having a third frequency that provides a coupling between the third energy level and a fourth energy level of the matter system.

8. The method of claim 7, wherein suppressing spontaneous emissions comprises surrounding the matter system with a photonic bandgap crystal.

9. The method of claim 7, wherein suppressing spontaneous emissions comprises selecting the matter system so that the fourth energy level is metastable.

10. The method of claim 7, wherein the quantum information processing function comprises a phase shift of a component state of the quantum information signal.

11. The process of claim 7, further comprising suppressing spontaneous emissions corresponding to transitions from the fourth energy level of the matter system.

12. A device comprising:
    a source of an electromagnetic signal in a state representing quantum information;
    a matter system having multiple quantum energy levels;
    a waveguide positioned to receive the electromagnetic signal, wherein the electromagnetic signal has a first frequency that provides a coupling between a first energy level of the matter system and the second energy level of the matter system, and the waveguide is further positioned to permit the electromagnetic signal to interact with the matter system during a quantum coherent operation on the state of the electromagnetic signal;
    a source external to the matter system arranged to produce photons having a second frequency that provides a coupling between a third energy level and the second energy level of the matter system; and
    a source external to the matter system arranged to produce photons having a third frequency that provides a coupling between a third energy level and a fourth energy level of the matter system.

13. The device of claim 12, wherein the source of photons having the second frequency comprises an electromagnetic control field that is directed at the matter system.

14. The device of claim 12, wherein the source of photons having the third frequency comprises an electromagnetic control field that is directed at the matter system.

15. The device of claim 12, further comprising a suppressive system that operates to suppress spontaneous emissions from the matter system.

16. The device of claim 15, wherein the suppressive system suppresses spontaneous emissions resulting from a transition of the matter system from the fourth energy level.

17. The device of claim 15, wherein the suppressive system comprises a photonic bandgap crystal around the matter system.

18. The device of claim 12, wherein the quantum coherent operation comprises a controlled phase shift of the state of the electromagnetic signal.

* * * * *

UNITED STATES PATENT AND TRADEMARK OFFICE
CERTIFICATE OF CORRECTION

PATENT NO. : 7,560,726 B2 Page 1 of 1
APPLICATION NO. : 10/364987
DATED : July 14, 2009
INVENTOR(S) : Raymond G. Beausoleil et al.

It is certified that error appears in the above-identified patent and that said Letters Patent is hereby corrected as shown below:

In column 5, line 58, delete "$\omega_c = (\omega_{34} + \theta_c)$" and insert -- $\omega_c = (\omega_{34} + v_c)$ --, therefor.

In column 10, line 61, delete "$\theta_a/\gamma_{21}$" and insert -- $v_a/\gamma_{21}$ --, therefor.

In column 11, line 14, delete "$v_c/\gamma_{21}$" and insert -- $v_c/\gamma_{41}$ --, therefor.

In column 13, line 46, delete "741" and insert -- $\gamma_{41}$ --, therefor.

In column 16, line 12, delete "|QCin>®|QTin>" and insert -- "|QCin>⊗|QTin>" --, therefor.

In column 16, line 13, delete "IQCout>(DIQTout>" and insert -- |QCout>⊗|QTout> --, therefor.

In column 16, line 46, delete "$\beta Q_c 1>$" and insert -- $|Q_c 1>$ --, therefor.

In column 17, lines 28-29, delete "$c_o|0> + c_1|1> + c_2 e^{i\theta}|2>$" and insert -- $c_o|0> + c_1|1> + c_2|2>$ --, therefor.

Signed and Sealed this

Sixth Day of April, 2010

David J. Kappos
*Director of the United States Patent and Trademark Office*